US012662803B2

(12) United States Patent
Smies et al.

(10) Patent No.: US 12,662,803 B2
(45) Date of Patent: Jun. 23, 2026

(54) PROGRAMMABLE FLUSH VALVE CONTROLLER

(71) Applicant: Kohler Co., Kohler, WI (US)

(72) Inventors: Joseph F. Smies, Sheboygan, WI (US);
John McCray Wilson, Howards Grove,
WI (US); Timothy John Waack,
Manitowoc, WI (US)

(73) Assignee: Kohler Co., Kohler, WI (US)

( * ) Notice: Subject to any disclaimer, the term of this
patent is extended or adjusted under 35
U.S.C. 154(b) by 374 days.

(21) Appl. No.: 18/238,129

(22) Filed: Aug. 25, 2023

(65) Prior Publication Data

US 2025/0067036 A1     Feb. 27, 2025

(51) Int. Cl.
*E03D 5/10* (2006.01)
*F16K 37/00* (2006.01)

(52) U.S. Cl.
CPC .......... *E03D 5/105* (2013.01); *F16K 37/0083*
(2013.01)

(58) Field of Classification Search
CPC ............................ E03D 5/105; F16K 37/0083
USPC ............................................................ 4/313
See application file for complete search history.

(56) References Cited

U.S. PATENT DOCUMENTS

| | | | |
|---|---|---|---|
| 5,224,685 | A | 7/1993 | Chiang et al. |
| 7,293,583 | B2 | 11/2007 | Arigoni |
| 8,037,551 | B2 | 10/2011 | Wilson |
| 8,561,225 | B2 | 10/2013 | Wilson et al. |

| | | | |
|---|---|---|---|
| 8,635,717 | B2 | 1/2014 | Wilson et al. |
| 9,347,209 | B2 | 5/2016 | Wilson et al. |
| 9,499,965 | B2 | 11/2016 | Wilson et al. |
| 9,595,185 | B1 | 3/2017 | Hall et al. |
| 2008/0196151 | A1 | 8/2008 | Oakes, Jr. |
| 2011/0155934 | A1* | 6/2011 | Guler ........................ E03D 3/06 |
| | | | 251/129.04 |
| 2017/0016221 | A1* | 1/2017 | Yamamoto ............. E03D 5/105 |
| 2017/0051486 | A1* | 2/2017 | Schomburg ........... A47K 10/18 |
| 2020/0268303 | A1 | 8/2020 | Oliva |
| 2022/0178126 | A1 | 6/2022 | Azuma et al. |
| 2023/0009654 | A1 | 1/2023 | Takaki et al. |
| 2025/0320699 | A1* | 10/2025 | Kuru ...................... E03D 5/105 |

FOREIGN PATENT DOCUMENTS

| | | |
|---|---|---|
| CN | 1329876 C | 8/2007 |
| CN | 103422556 B | 11/2015 |
| CN | 216108822 U | 3/2022 |
| JP | H10131261 A | 5/1998 |
| JP | 2002339430 A | 11/2002 |
| WO | 2006042053 A2 | 4/2006 |
| WO | 2020146525 A1 | 7/2020 |
| WO | 2021145879 A1 | 7/2021 |
| WO | 2021225543 A1 | 11/2021 |
| WO | 2022163034 A1 | 8/2022 |

* cited by examiner

*Primary Examiner* — Huyen D Le

(74) *Attorney, Agent, or Firm* — Lempia Summerfield
Katz LLC

(57) ABSTRACT

A control device for a flush valve of a toilet includes at least
a communication interface, a sensor, and a processor. The
communication interface is configured to wirelessly receive
at least one flush configuration setting for the toilet. The
sensor is configured to generate sensor data for at least a
presence of a user. The processor is configured to generate
a control signal for the flush valve of the toilet based on the
wirelessly received at least one configuration setting for the
toilet or in response to the sensor data.

16 Claims, 27 Drawing Sheets

S201

RECEIVE A COMMAND INCLUDING A CONFIGURATION
SETTING FROM A PROGRAMMING DEVICE.

S203

RECEIVE SENSOR DATA FROM A SENSOR.

S205

ANALYZE THE SENSOR DATA ACCORDING
TO THE CONFIGURATION SETTING.

S207

GENERATE A TOILET STATUS INDICATOR IN RESPONSE
TO THE ANALYSIS OF THE SENSOR DATA.

PROGRAMMABLE FLUSH VALVE CONTROLLER

FIELD

The present application relates generally to the field of flushometers for use with urinals, toilets, water closets, and other devices. More specifically, this application relates to flushometers for improved performance and durability and/or a programmable electronic controller therefor.

BACKGROUND

A flushometer utilizes the water pressure from the water supply system, as opposite to gravity from a toilet tank. The flushometer traditionally includes a divider that separates the water supply system from a pressure chamber. The divider allows the flush valve to open and let water into the bowl in response to movement of a handle.

Automated flush systems may omit such a handle and instead rely on the automatic detection of a user or other activity in the proximity of the sensor or toilet. Often a manual flush button may be included. However, there is a problem that the manual flush button may allow continuous or repeating flush, which leads to wasting water, malfunction, or vandalism.

BRIEF DESCRIPTION OF THE DRAWINGS

Exemplary embodiments are described herein with reference to the following drawings, according to an exemplary embodiment.

DETAILED DESCRIPTION

At least some of the following embodiments include apparatus and techniques for supply line flush valves (e.g., flushometers) related to urinals, toilets, and water closets, having a single flush manual operation that prevents excessive flushing. Throughout this disclosure, the term toilet may be used to refer to any one or a combination of urinals, toilets, and water closets. Some supply line flush valves may be susceptible to excessive or continuous flushing through holding down a manual flush button. The following examples prevent such vandalism through a manual override device. In addition, at least some of the following embodiments include a programmable electronic controller that allows various flushing parameters to be customized so that the programmable electronic controller is used across a variety of toilet models and so that the end user may select a variety of specialized configurations for the toilet.

The flushometer valve includes a hollow body and a piston assembly that is disposed inside the hollow body for controlling operation of the flushometer valve. The piston assembly and the hollow body define an inlet chamber, an outlet chamber and a pressure chamber. The piston assembly includes a flow guide, a piston top, and an insert. The flow guide is movable relative to the hollow body between an open position, in which the outlet chamber is fluidly connected to the inlet chamber, and a closed position, in which the outlet chamber is fluidly disconnected from the inlet chamber. The piston top (upstream side) is coupled to the flow guide, includes a first material, and has a bleed passage that fluidly connects the pressure chamber and the inlet chamber. The insert has a bore that fluidly connects the bleed passage and the pressure chamber.

Referring generally to the FIGURES, disclosed herein are flushometers (e.g., flush valves, flushometer valves, etc.) for use with urinals, toilets, water closets, and other devices. Flushometers are configured to control the flow and amount of water through the flush valve (e.g., from an inlet to an outlet) for each flushing operation/cycle. The flushometers are configured to pass water at a relatively high rate of flow even if the urinal is fluidly connected to a water supply having a relatively low water pressure.

Figure 1:
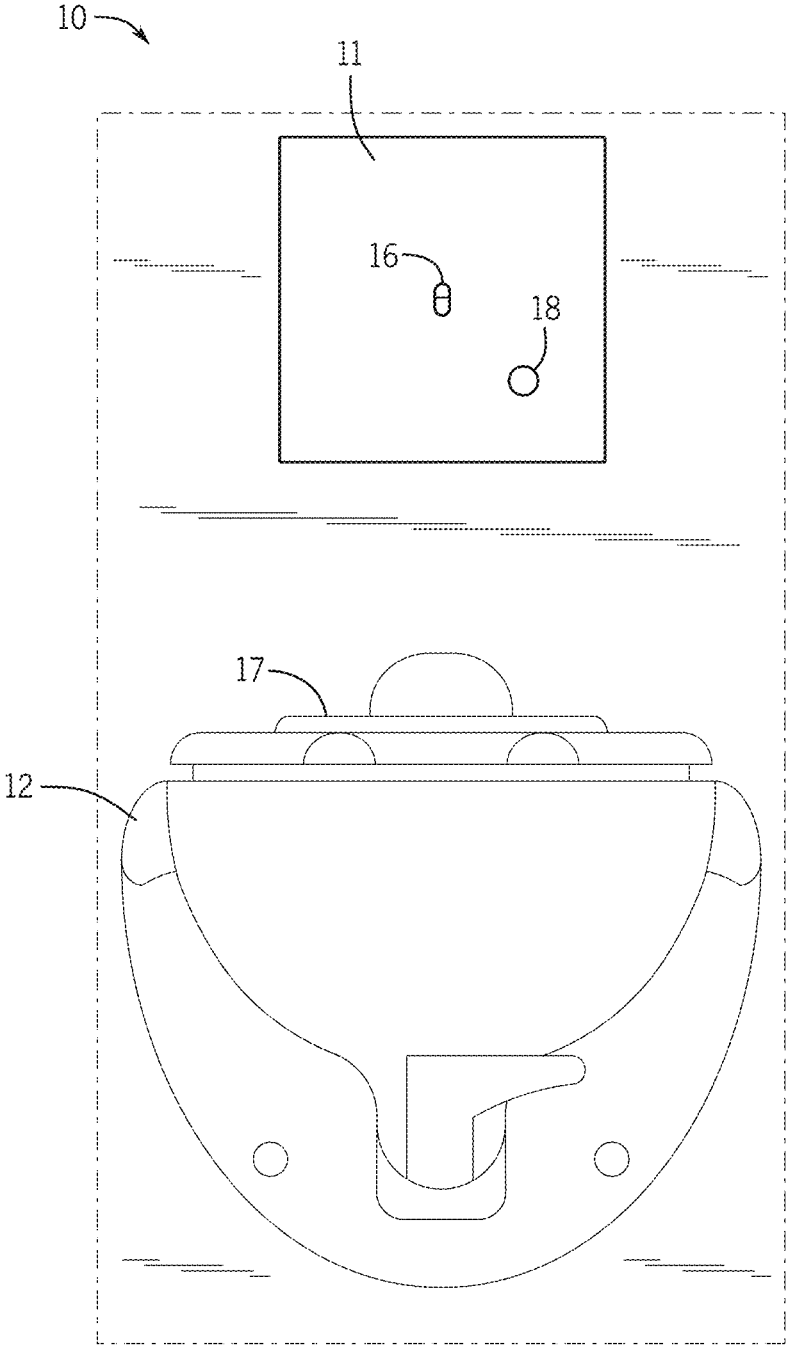
FIG. 1 illustrates an example in-wall toilet flushometer installation.

FIG. 1 illustrates an example in-wall toilet 10 including a wall-mounted bowl 12 and a faceplate 11 including at least one input 18 and at least one sensor 16 (as described in more detail herein). The bowl 12 which is configured to receive human waste and transport the waste from the bowl 12 to a sewer line. A supply line to the bowl 12 is opened to supply water to the toilet bowl 12 and flush the bowl 12. The supply line may include a valve operable in response to actuation of the input 18 and/or presence or motion detected by the sensor 16. While a toilet is described throughout, a urinal or other water consuming devices may be used in combination with the following embodiments. Additional, different, or fewer components may be included.

FIG. 1 illustrates an exemplary embodiment of a toilet 10, which may be configured as a wall-hung toilet. In other words, the toilet 10 may be configured to mount to a wall, as opposed to resting on the floor. According to various exemplary embodiments, the toilet 10 may be formed from vitreous china, porcelain, stainless steel, or any suitable material.

The toilet 10 may include a lid, a seat, both a lid and a seat, or other attachments pivotally coupled to the toilet 10. As shown in FIG. 1, the toilet 10 includes an attachment 17, such as a lid attachment, that is coupled to a top surface of the toilet 10. In other exemplary embodiments, the attachment 17 of the toilet 10 may alternatively or additionally include a seat attachment and/or a bidet attachment.

Figure 2:
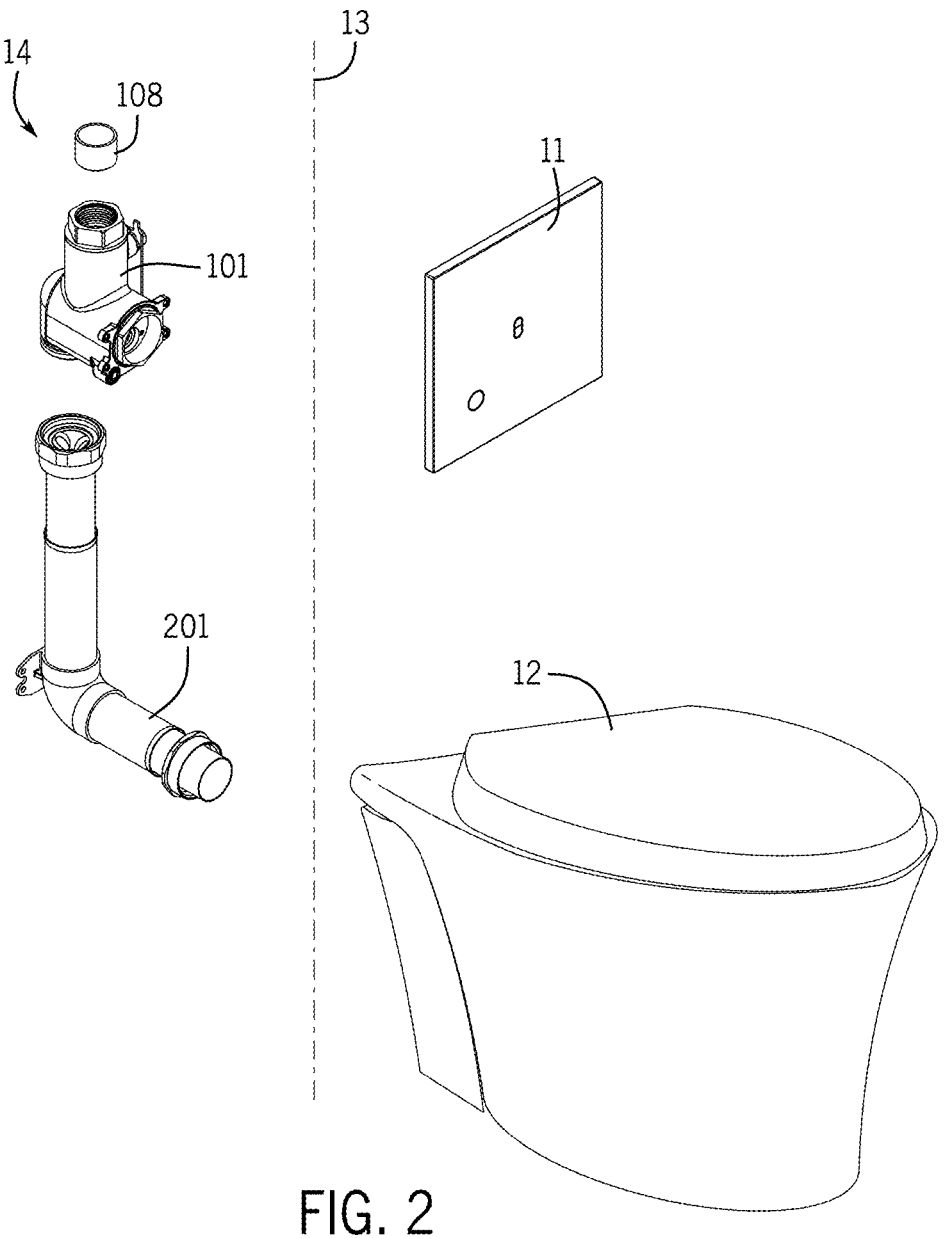
FIG. 2 illustrates an example installation of an in-wall toilet flushometer.

FIG. 2 illustrates an example installation of an in-wall toilet. The toilet bowl 12 and faceplate 11 are mounted on wall 15. Behind the wall is the water supply system 14 including at least one connector 108, a valve assembly 101, and a tailpiece assembly 201. Additional, different, or fewer components may be included.

The toilet 10 is installed on (e.g., mounted to) the wall 15. The toilet 10 may include one or more mounting holes that are configured to facilitate mounting the toilet 10 to the wall 15, such as, using one or more fasteners and/or threaded stud bolts. The mounting holes of the toilet may be arranged within a mounting wall in a variety of ways that are configured to provide sufficient support for the toilet when the toilet is installed on a wall. For example, the mounting holes may be centered between left and right sides of the toilet proximate a bottom and top of a mounting wall. Also, the mounting holes may be provided on left and right sides of the toilet proximate a bottom portion of the mounting wall.

Figure 3:
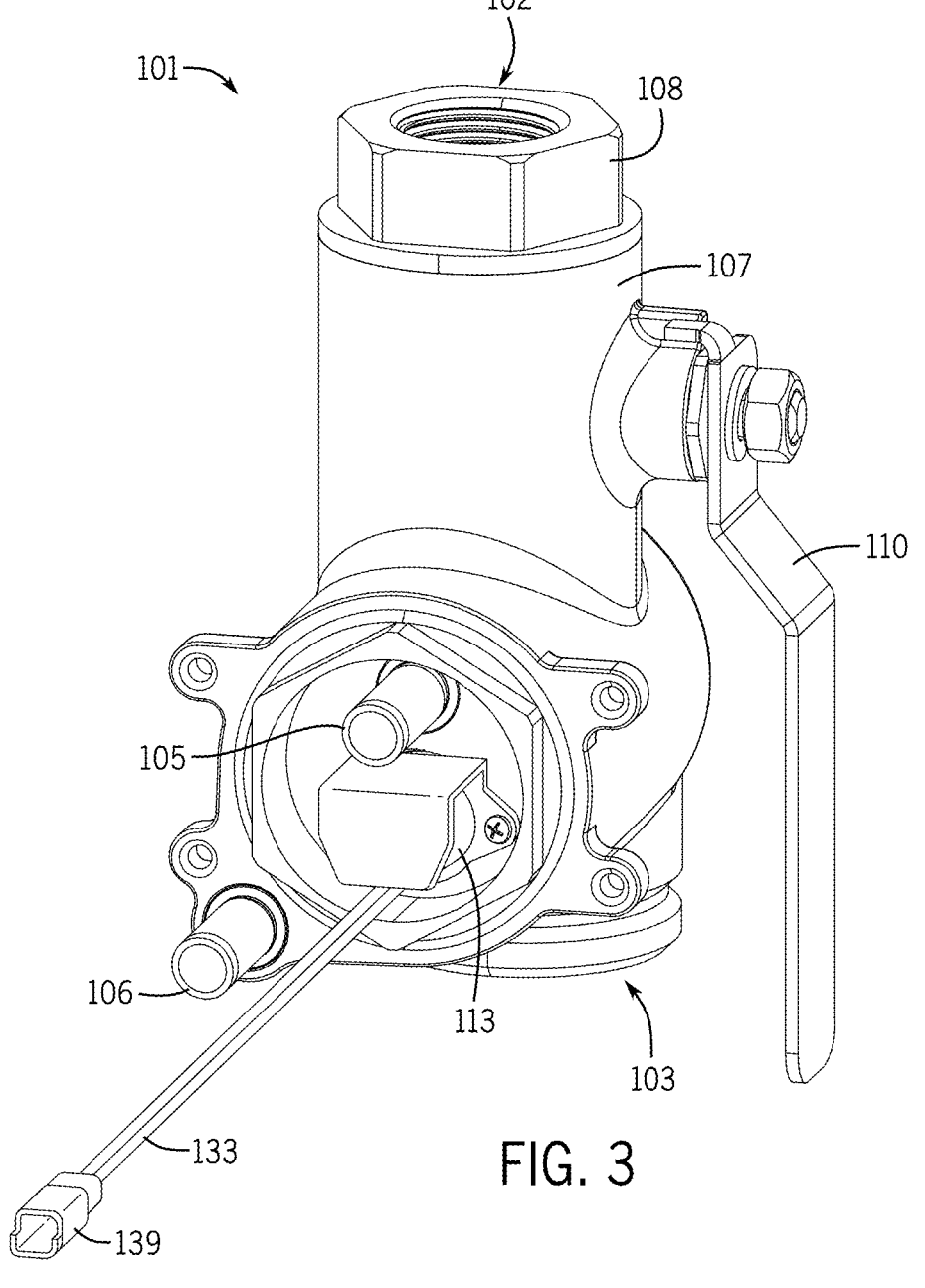
FIG. 3 illustrates an example valve assembly for the in-wall toilet flushometer.

FIG. 3 illustrates a more detailed view of the example valve assembly 101 for the in-wall toilet 10. The valve assembly 101 includes an inlet 102, an outlet 103, a threaded connector 108, a housing 107, a handle 110, a manual override supplier port 105, a manual override output port 106, and an actuator 113. The actuator 113 may be a solenoid connected to at least one wire 133 and connector 139, which may be configured to electrically connect to the solenoid connector 176 and wire 177 described separately. Additional, different, or fewer components may be included.

Figure 4:
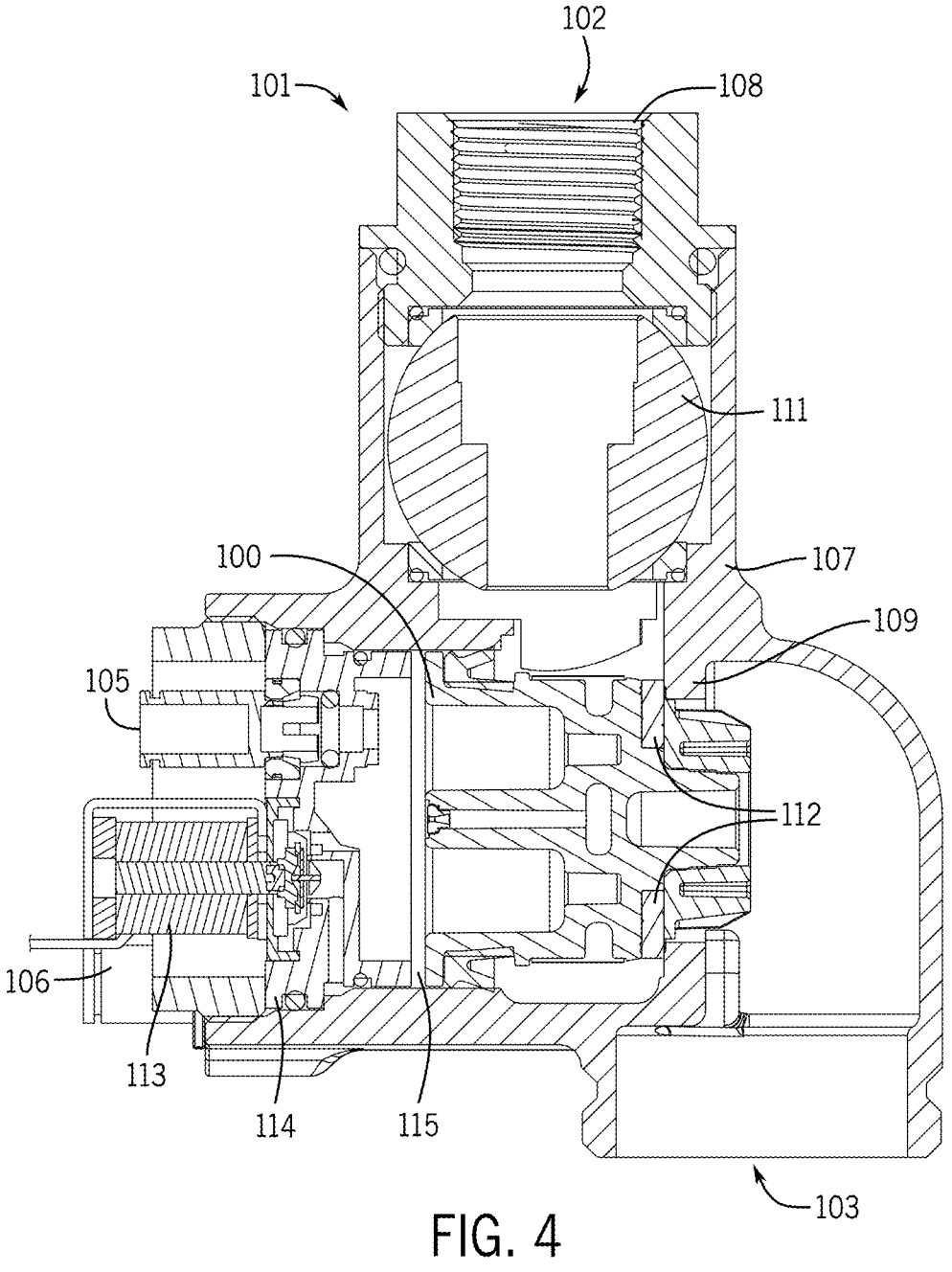
FIG. 4 illustrates an example cross section of the valve assembly.

FIG. 4 further illustrates a valve 111 (e.g., valve member, ball valve) that is configured to open and close the valve assembly 101 between the inlet 102 and the outlet 103. The handle 110 rotates the valve 111.

Also, within the housing 107 a piston 100 is supported. The piston 100 is movable left and right but other arrangements may include a piston that moves up and down or at another angle. The housing 107 may include at least one abutment portion 109. The piston 100 and the abutment portion 109 meet at a flat gasket 112 to seal the perimeter of the piston 100 when the piston 100 is in the closed position, as shown in FIG. 4, at a first end (e.g., downstream side, right side of the piston 100). The piston 100 is pushed into the closed position through water pressure provided at cavity 115 (water pressure cavity). On the second end (e.g., upstream sided, left side of the piston 100), a piston cover assembly 114 receives the piston 100 when the piston 100 is in the open position. The piston cover assembly 114 may also define the cavity 115 between the piston 100 and the piston cover assembly 114.

The actuator 113 (solenoid) is configured to apply a force to the piston 100 to move the piston into the open position and allow water to flow through the housing 107 in the direction of arrow A. The actuator 113 may directly contact the piston 100 to move the piston. The actuator 113 may open a vent that changes the water pressure holding the piston 100 in the closed position. The flow of water is provided to the toilet 10 for flushing the toilet 10. The water may be provided through one or more rim jets, one or more sump jets or another orifice associated with the toilet bowl 12. The solenoid may be a latching style solenoid that is energized at varying amount to achieve the open position and the closed position.

Figure 5:
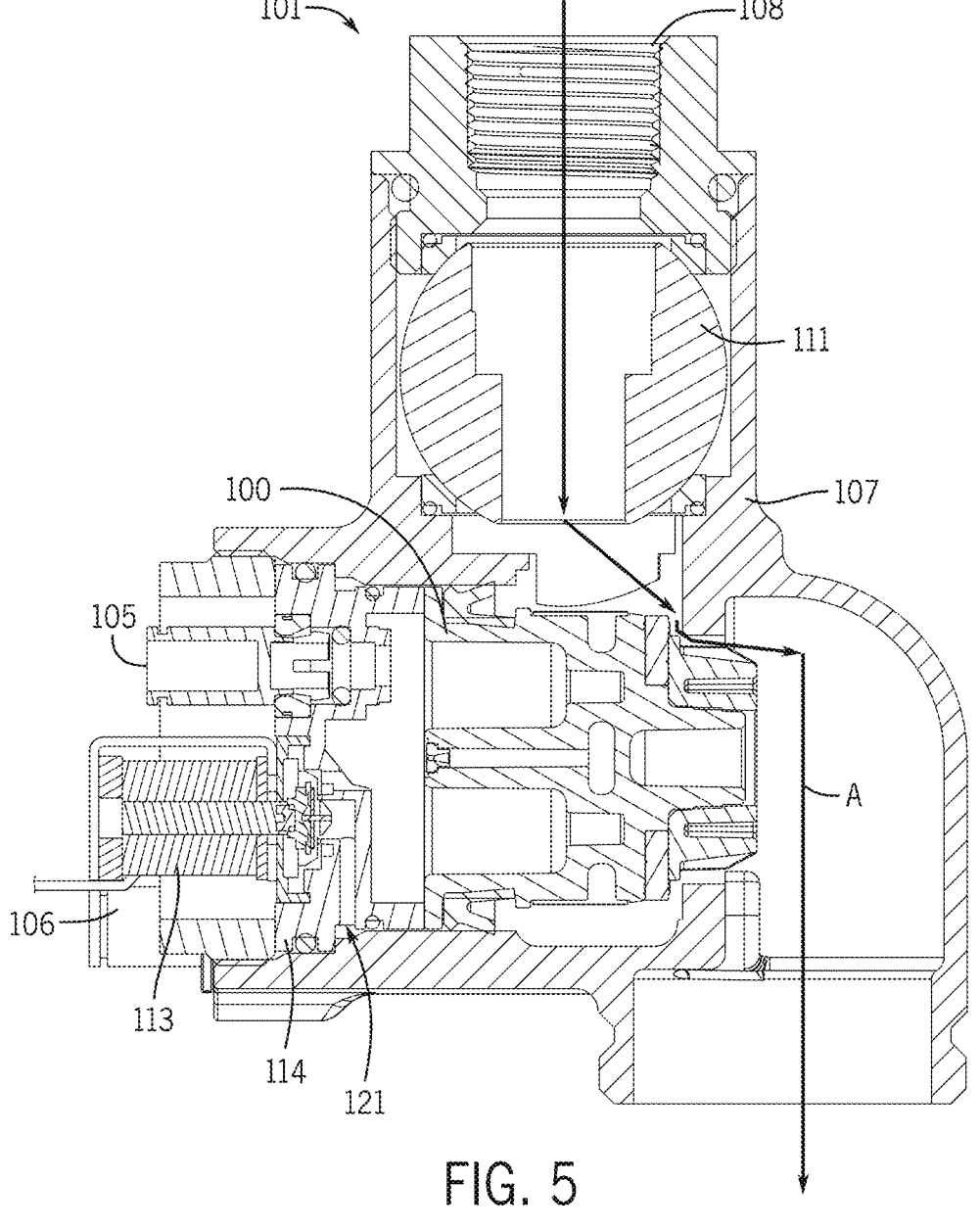
FIG. 5 illustrates the valve assembly in an open state.

FIG. 5 illustrates the valve assembly 101 in an open state. In the open state, both the ball valve 111 and the piston 100 are open. The piston 100 is pulled to the left so that water travels past the piston 100, as shown by arrow A.

Figure 6:
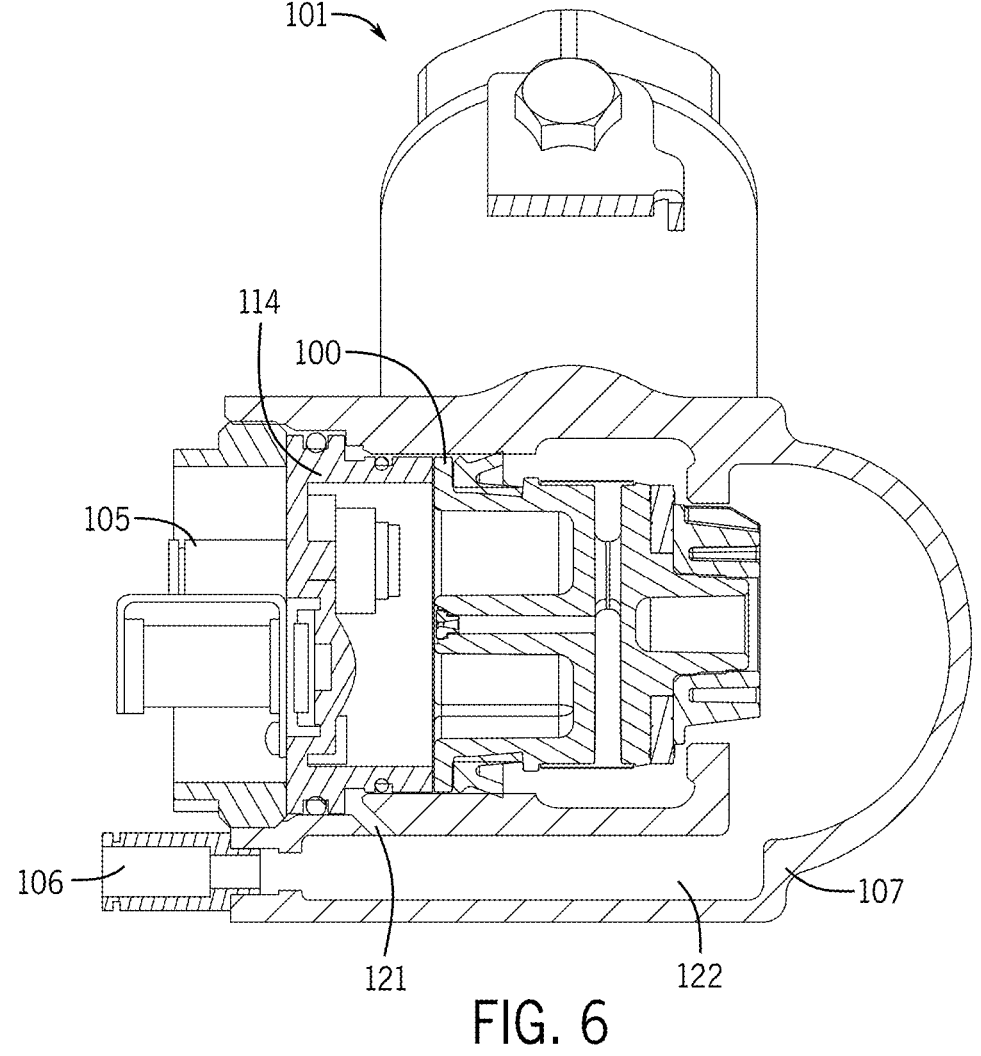
FIG. 6 illustrates the valve assembly in a closed state.

FIG. 6 illustrates the valve assembly 101 in a closed state. In the closed state, the piston 100 has moved back to the right, creating the seal with opening in the valve assembly 101.

When the actuator 113 is moved to the open position against the water pressure at cavity 115, water is expelled out of the cavity 115. The water may be pushed out through a vent or channel in the housing 107. This causes the water pressure to drop between the piston 100 and the piston cover assembly 114.

For example, when the vent is opened, water pressure is released in the cavity 115. With the water pressure in the cavity 115 less that the water pressure in the main passage of the flush valve assembly 101, the piston 100 is pushed to the left.

Example vents including solenoid channel 121 and valve body vent channel 122 are illustrated in FIG. 6. The solenoid channel 121 and the valve body vent channel 122 may be fluidly connected to form the vent.

Figure 7:
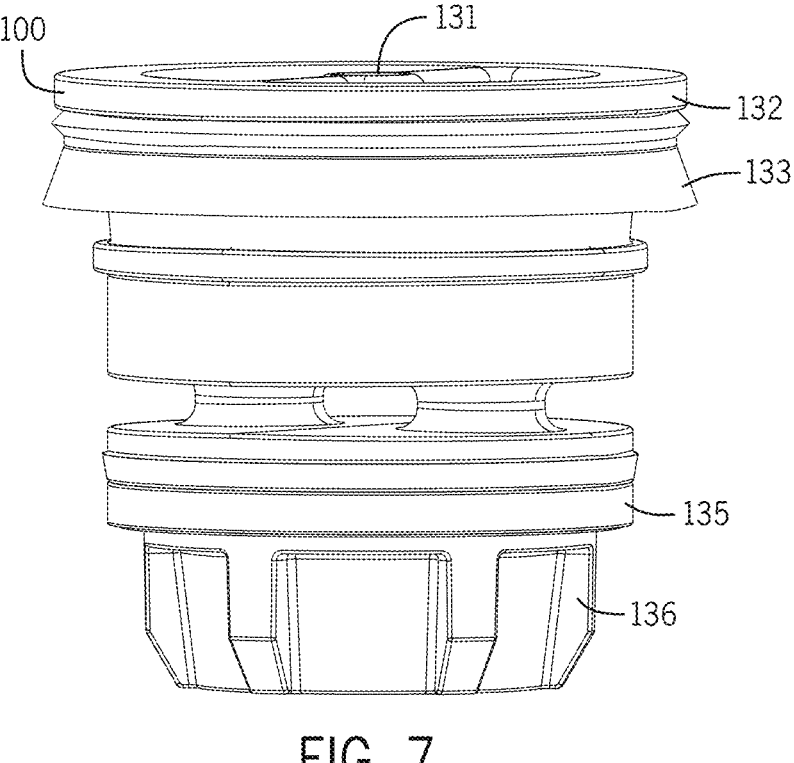
FIG. 7 illustrates a piston for the valve assembly.
Figure 8:
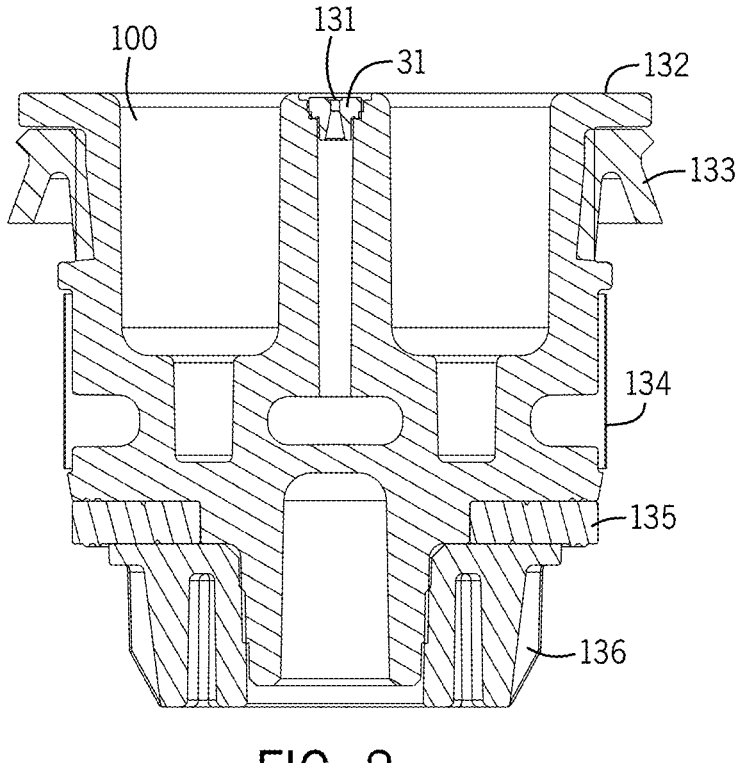
FIG. 8 illustrates a cross section of the piston for the valve assembly.

FIG. 7 illustrates a detailed view of the exterior of the piston 100 for the valve assembly 101. FIG. 8 illustrates a cross section of the piston 100 for the valve assembly 101. The piston 100 may include a bleed hole 131, an upper piston body 132, a seal (e.g., U-seal), as gasket seal 135, and a flow ring 136.

The bleed hole 131 is an opening or aperture that allows water from the main passage of the flush valve assembly 101 to enter (and fill) the cavity 115 (water pressure cavity). The bleed hole 131 may have a specific diameter or shape. The bleed hole 131 may be configured to allow a predetermined flowrate of water to enter the cavity 115. The bleed hole 131 may be an opening in a bleed insert 31 that is inserted into the piston 100 (e.g., into the upper piston body 132).

The size of the bleed hole 131 may be selected according of a desired flush volume or flush duration for the toilet 10. A smaller bleed hole 131 allows the cavity 115 to fill more slowly, which keeps the piston open (e.g., to the left) for a longer period and increases the flush volume and/or flush duration. A larger bleed hole 131 allows the cavity 115 to fill more quickly, which keeps the piston open (e.g., to the left) for a shorter period and decreases the flush volume and/or flush duration.

The size of the bleed hole 131 may be variable or adjustable. For example, the bleed insert 31 may be replacement with another bleed insert have a different size bleed hole 131. Alternatively, the bleed insert 31 may be rotated against a tab or flange to adjust the bleed hole 131. For example, the bleed hole 131 may have a triangular cross section opening that is selectively blocked by the tab as the bleed insert 31 is rotated within the piston 100 (e.g., upper piston body 132).

In addition or in the alternative, the size of the cavity 115 may be adjusted according of a desired flush volume or flush duration for the toilet 10. A larger cavity 115 fills more slowly, which keeps the piston open (e.g., to the left) for a longer period and increases the flush volume and/or flush duration. A smaller cavity 115 fills more quickly, which keeps the piston open (e.g., to the left) for a shorter period and decreases the flush volume and/or flush duration. In one example, the piston cover assembly 114 is threaded and can be rotated relative to the valve housing 107 to adjust the size of the cavity 115.

The bleed hole 131 may be located in the center or within a predetermined distance to the center of the piston 100 or the upper piston body 132. A consistent flush volume may be achieved by locating the bleed hole 131 near the center of the piston 100 or the upper piston body 132.

Figure 9:
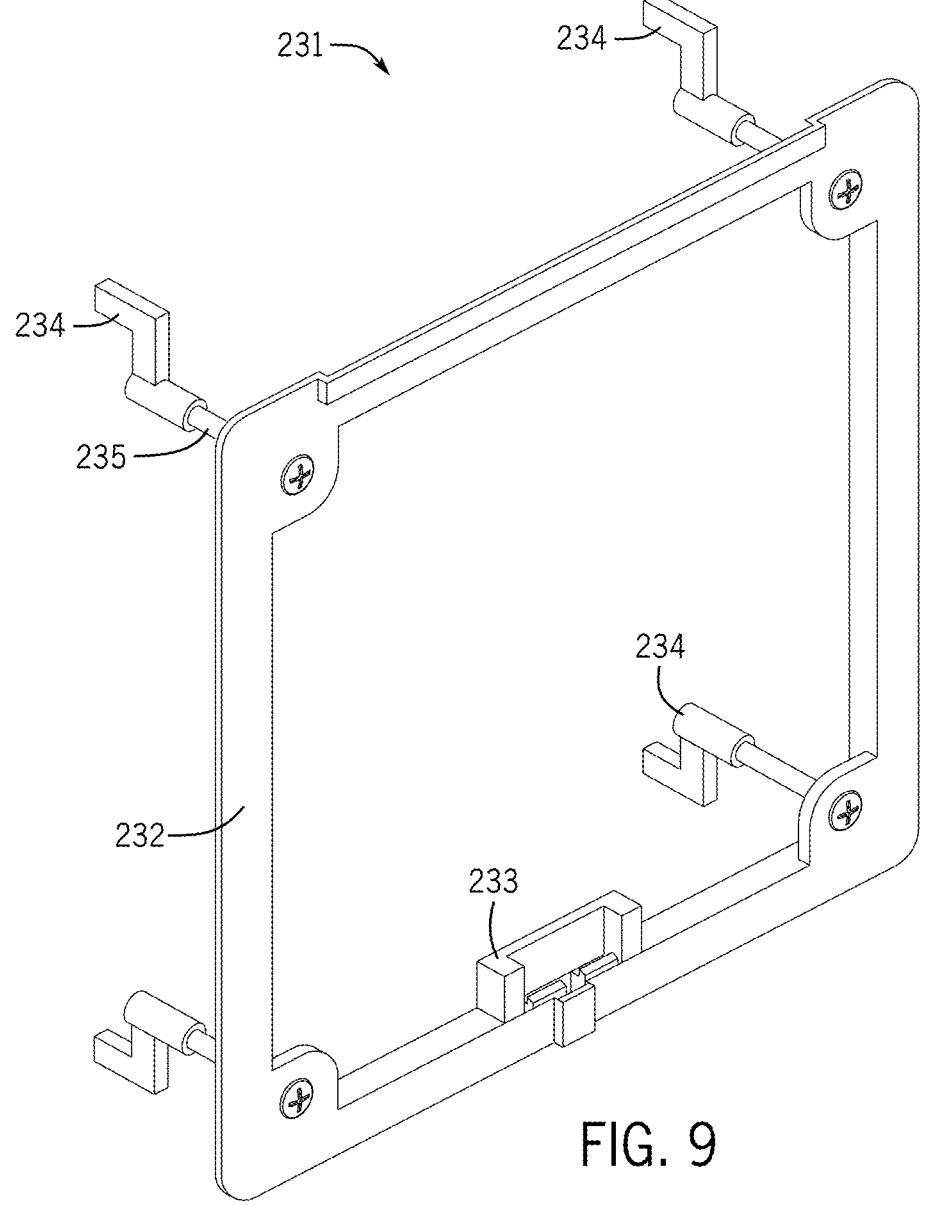
FIG. 9 illustrates an example wall bracket.

FIG. 9 illustrates an example wall bracket 231 for the face plate 11. The wall bracket 231 may include a frame 232 including multiple apertures or hole through with a shaft or screw 235 connected rotatable connectors 234 to secure the wall bracket 231 to the wall 15. The wall bracket 231 may also include a latch 233 configured to move between a latch down position, which locks face plate 11 to the wall bracket 231 and a latch up position, which allows the face plate 11 to be removed from wall bracket 231. The latch 233 may include a spring to move the latch 233 to the latch up position. A tool such as a hex wrench may be used to move the latch 233 to the latch up position.

Figure 10:
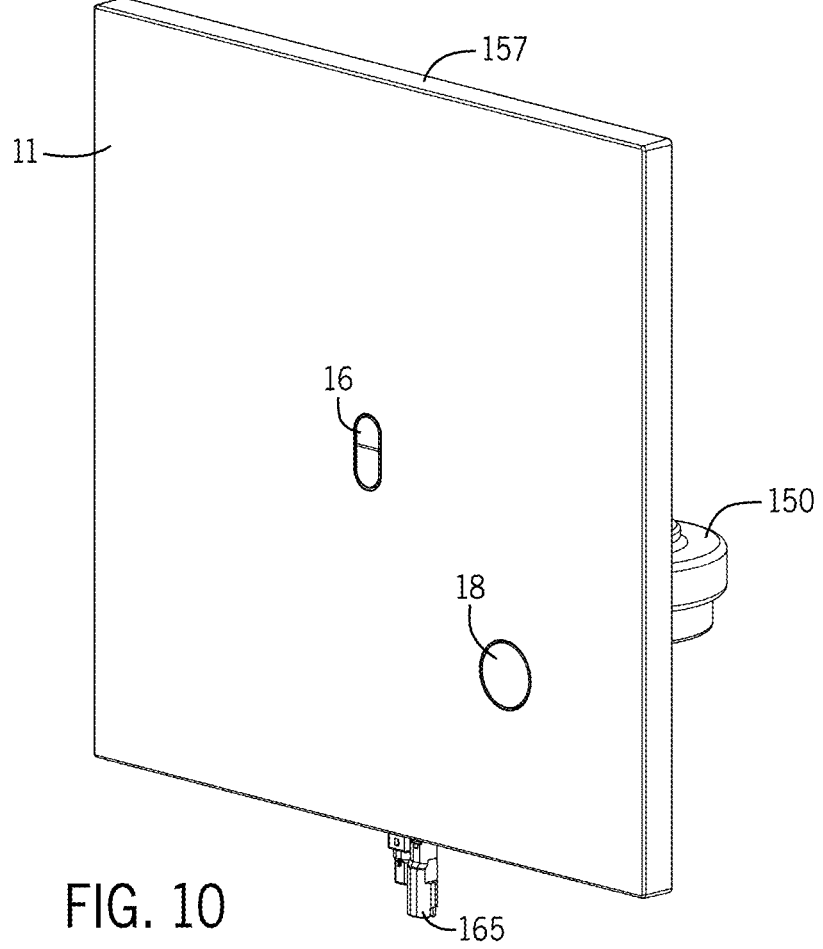
FIG. 10 illustrates an example faceplate for the in-wall toilet.
Figure 11:
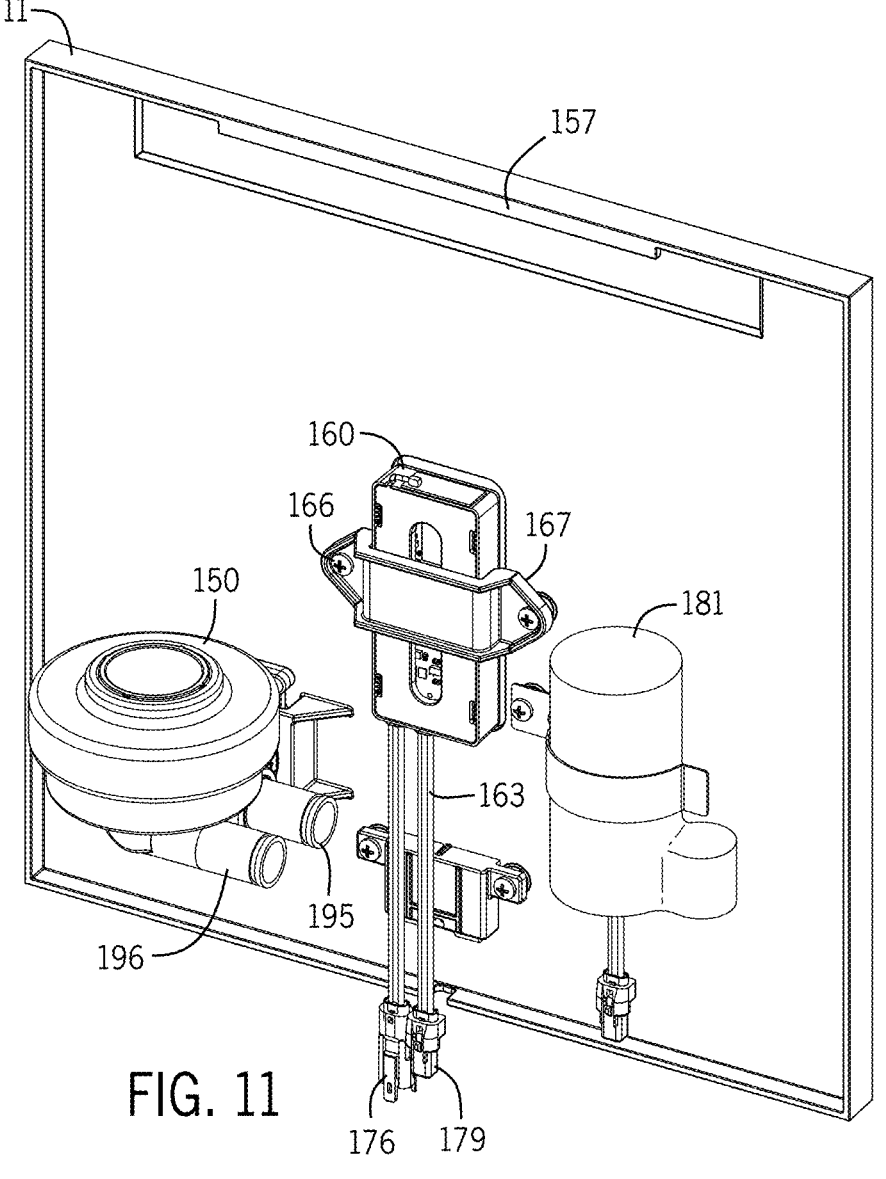
FIG. 11 illustrates an example rear view of the faceplate for the in-wall toilet.
Figure 12:
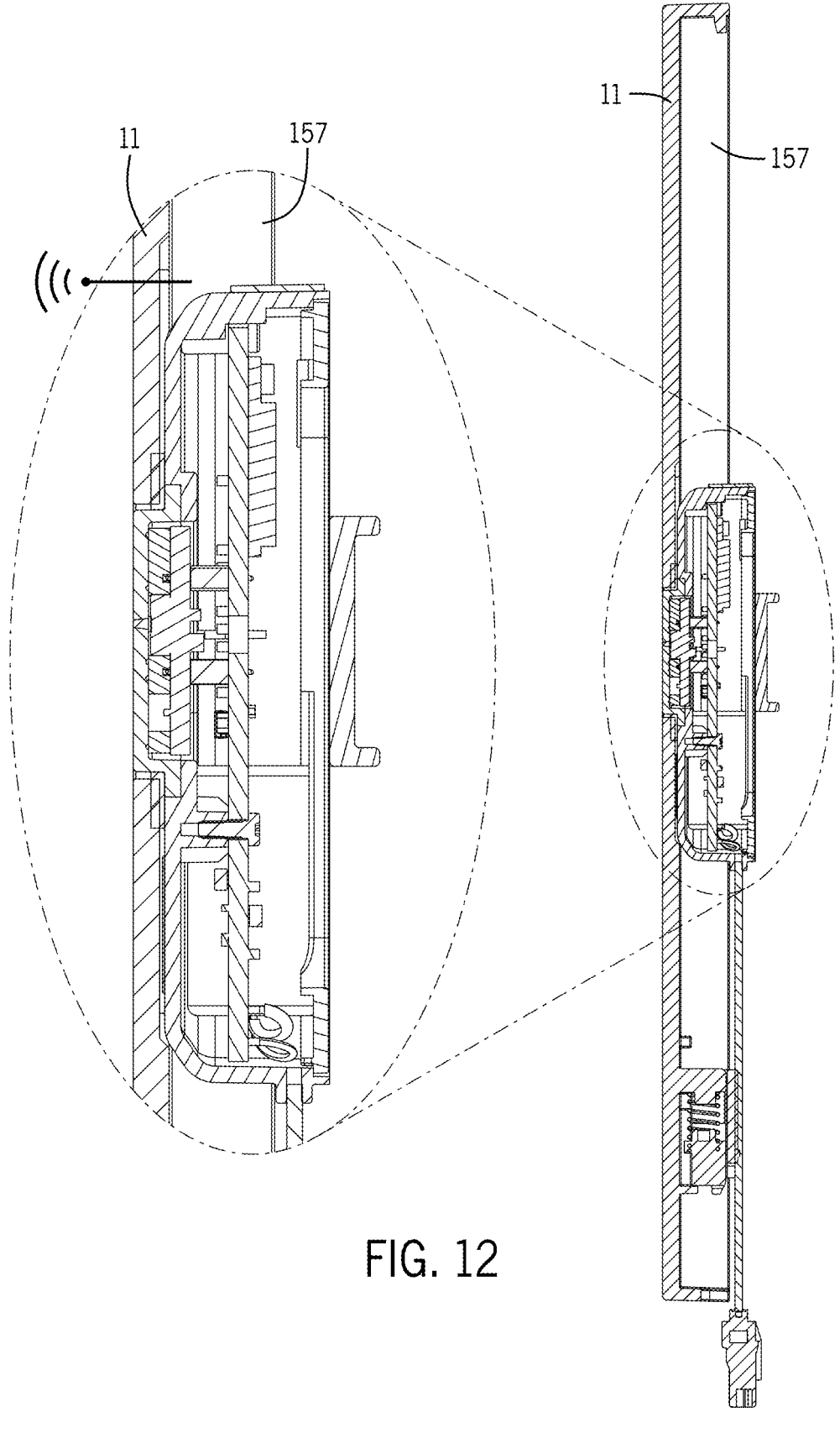
FIG. 12 illustrates an example side view of the faceplate for the in-wall toilet.

FIG. 10 illustrates an example faceplate 11 for the in-wall toilet. The faceplate may be mounted in a frame 157 configured to be secured to the wall bracket 231. The frame 157 and the wall bracket 231 may be integrated in a single structure. FIG. 11 illustrates an example rear view of the faceplate 11 for the in-wall toilet including the manual valve 150, the programmable controller 160, and the battery 181 electrically coupled to the programmable controller 160. The controller 160 may be secured to the back of the faceplate 11 using one or more fasteners 166 and a bracket 167. FIG. 12 illustrates an example side view of the faceplate for the in-wall toilet.

Figure 13:
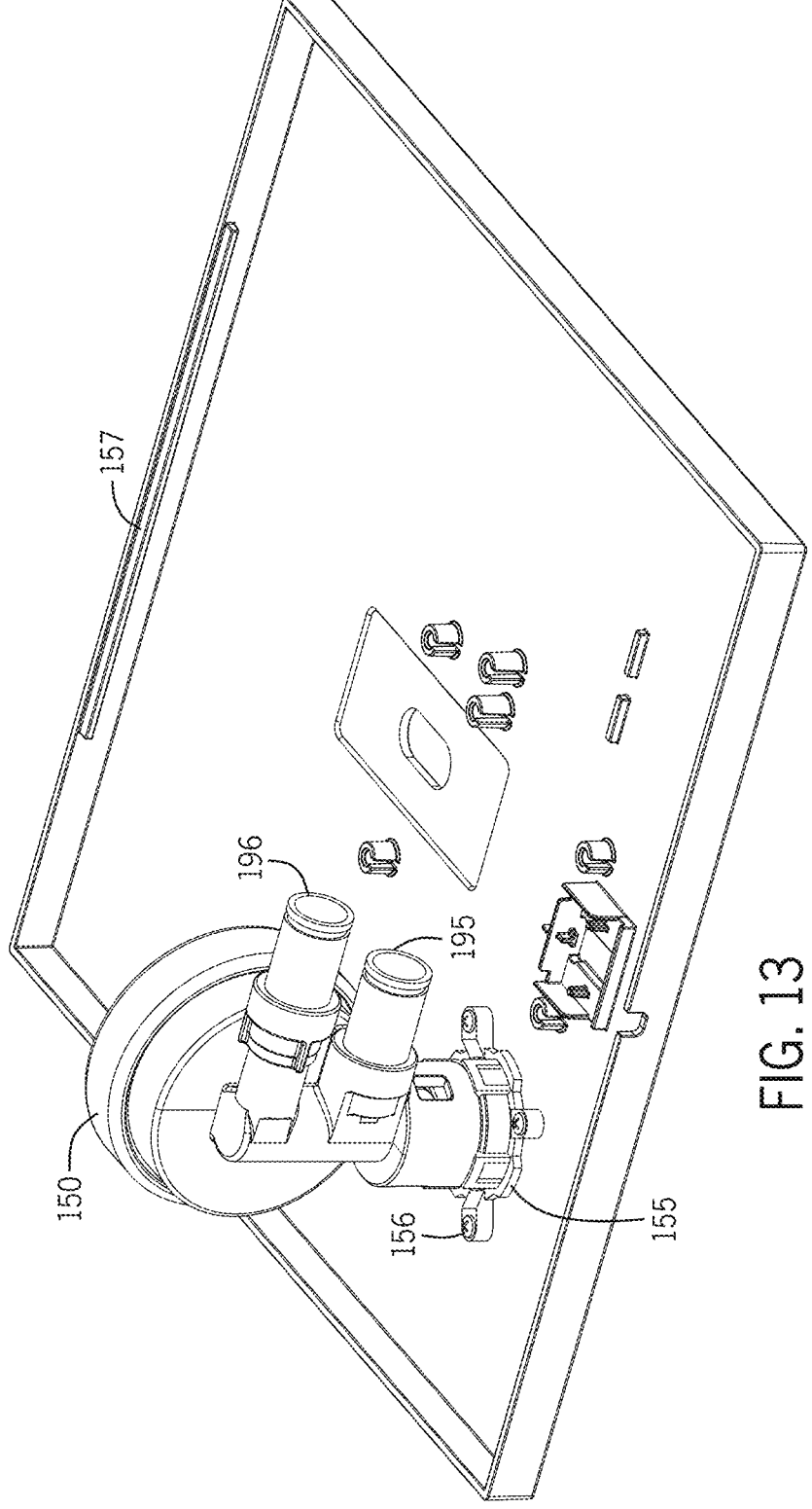
FIG. 13 illustrates an example manual valve for the in-wall toilet.

FIG. 13 illustrates an example manual valve 150 mounted to the rear side of the frame 157 of the face plate 11 for the in-wall toilet 10. The manual valve 150 includes an override input 195 and an override output 196. The override input 195 is connected to the manual override supplier port 105. The override output 196 is connected to the manual override output port 106. The valve housing 107 includes at least one channel for operation of the manual override device 150.

Figure 14:
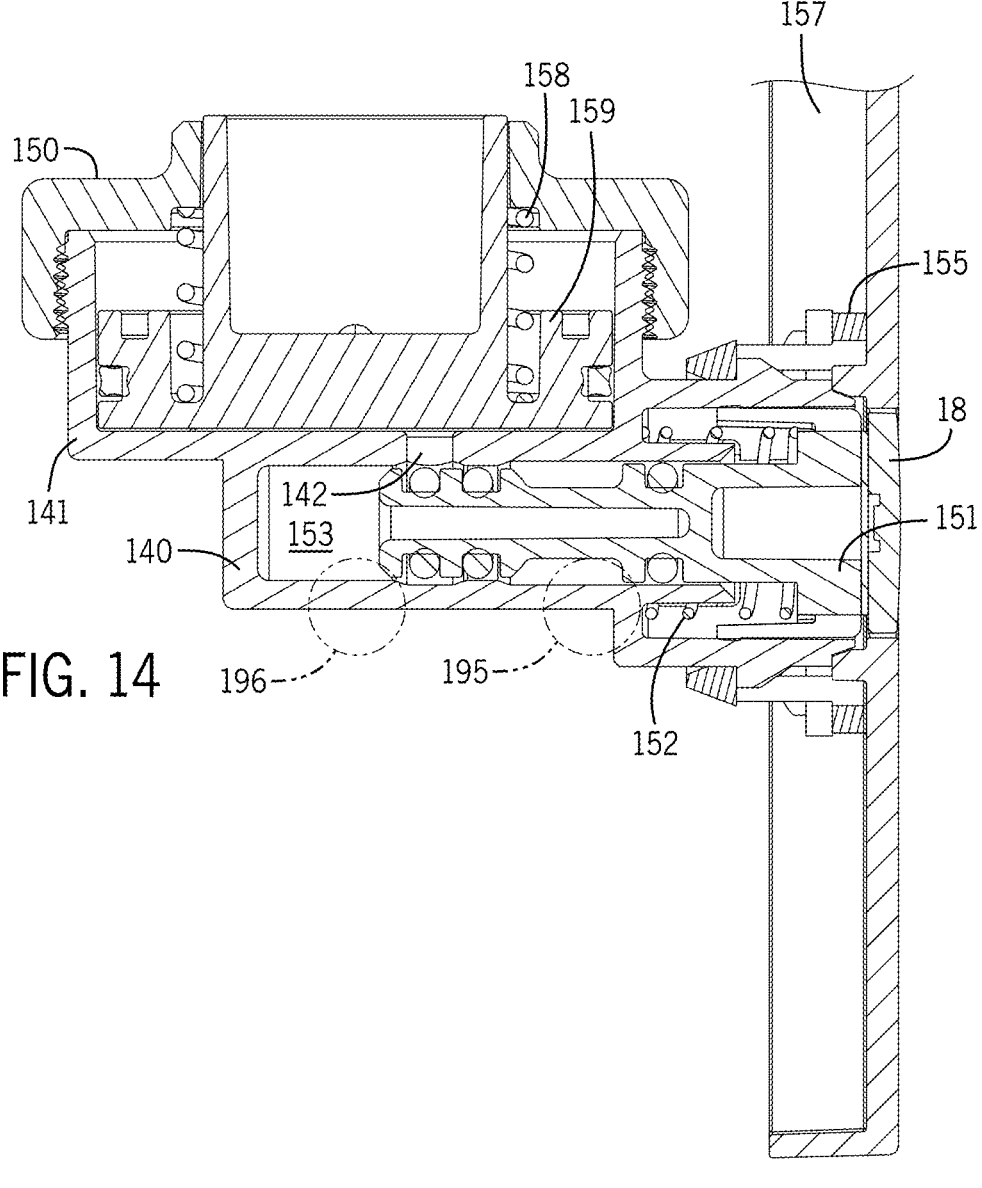
FIG. 14 illustrates a side view of the manual valve.
Figure 15:
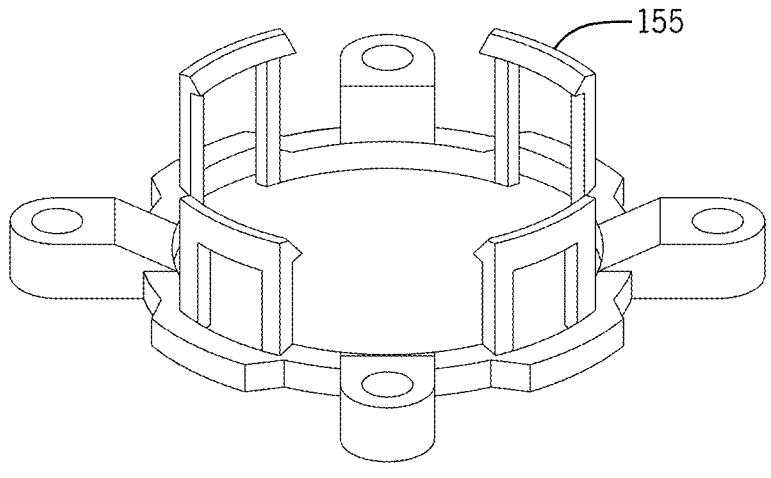
FIG. 15 illustrates an installation collar for the manual valve.

FIG. 14 illustrates a side view of the manual valve 150 mounted on the frame 157 using collar 155. FIG. 15 illustrates detail of the collar 155. The manual valve 150 includes a lower portion 140 and an upper portion 141 connected by port 142. The lower portion 140 includes a chamber 153 having a diverter 151, which may be referred to as an override valve, held into position by spring 152. The upper portion 141 includes a chamber 154 having a slider 159 held into position by spring 158. Either the chamber 153, the chamber 154, or a combination of the chamber 153 and the chamber 154 is considered the override chamber. One side of the diverter 151 in the chamber 153 is connected to the override input 195 (shown in FIG. 13 but not shown. The other side of the diverter 151 in the chamber 153 is connected to the override output 196. In a first position of the diverter 151, the override input 195 is connected to the port 142 and the chamber 154. In a second position the diverter 151, the override output 196 is connected to the port 142 and the chamber 154. Thus, the chamber 153 is an override chamber including a first fluid connection, override input 195 connected to manual override supplier port 105 at the first side of the piston 100 in the flush valve assembly 101 and a second fluid connection, override output 196 connected to manual override output port 106 at the second side of the piston 100 in the flush valve assembly 101.

When the user presses or otherwise actuates input 18, the diverter 151 moves to the left, opening the port 142 to the manual override supplier port 105, which provides a fluid path for the water pressure near the piston 100 to evacuate fluid from the first side of the piston 100. The fluid evacuated from the first side of the piston 100 is provided through the first fluid connection to the override chamber 153. Initiation of the evacuation of fluid from the first sided of the piston 100 begins a flush cycle in the flush valve assembly 101. That is, by movement of the piston 100 open the main path in the flush valve assembly 101 to connect the inlet 102 and outlet 103 to provide a path of water from the supply line to the toilet 10.

The flush cycle may be limited to the operation of the piston 100 regardless of whether the input 18 is immediately released. That is, once the input 18 is pressed, the diverter allows evacuation of water from the cavity 115, the cavity 115 will begin to fill with water pressure again through the bleed hole 131 in the piston 100. When the water pressure reaches a predetermined level, the piston 100 is pushed back to the closed position, and the flush cycle ends. Therefore, no matter how long the manual flush is requested by the user through input 18, only one flush may be performed. Thus, even when the override chamber is substantially full, the piston 100 is closed through accumulation of water on the first side of the piston 100. The flush cycle ends after the override chamber is substantially full.

When the input 18 is released (or further actuated), or the diverter 151 moves back to the home position under the force of spring 152, the diverter 151 moves to the right, opening the port 142 to the manual override output port 106 so that the water in chamber 154 is released. The water may be pushed from chamber 154 by be slider 159 biased by spring 158. The spring 158 is an example energy storage device associated with the override chamber and configured to provide a force to discharge the fluid in the override chamber. The slider 159 may be coupled to the spring 158.

The right position of the diverter 151 provides a fluid path for the water in chamber 154 to return to chamber 153 and then through the manual override output port 106 to return to the valve assembly 101. The water may be passes to the outlet 103 of the valve assembly 101. In one example, as shown in FIG. 6, the manual override output port 106 connects to the valve body vent channel 122 for a path through the valve assembly 101 to the outlet 103. The valve body vent channel 122 may provide a path to evacuate fluid from the override device 150 to the second side of the piston 100.

Figure 16:
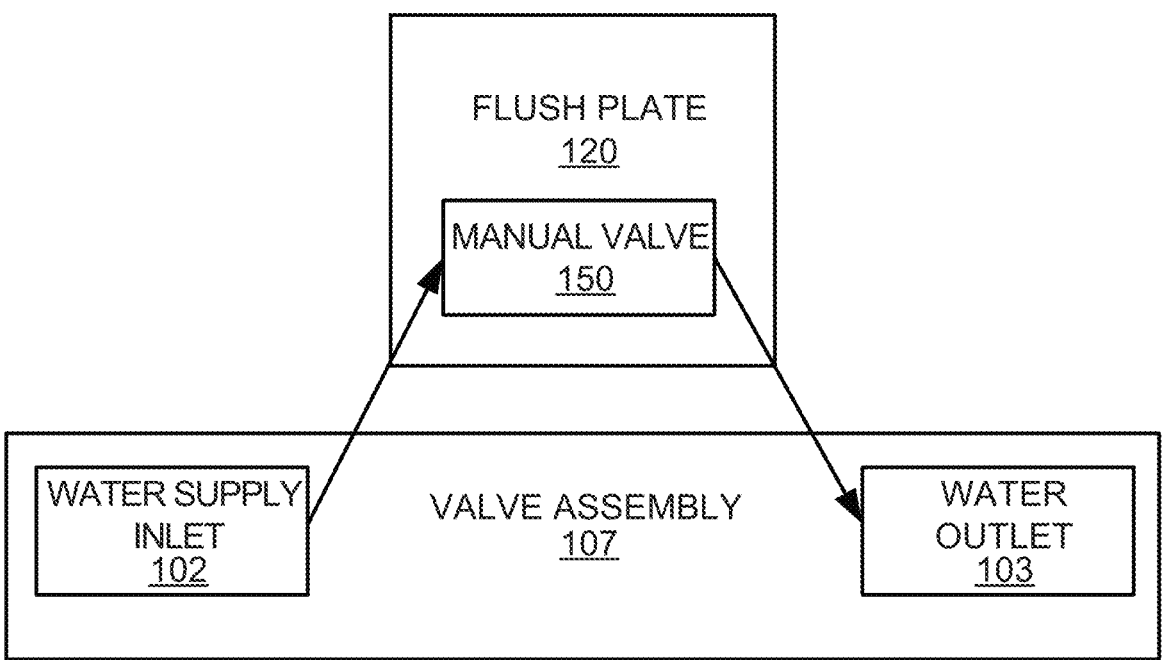
FIG. 16 illustrates an example block diagram for the manual valve.
Figure 17:
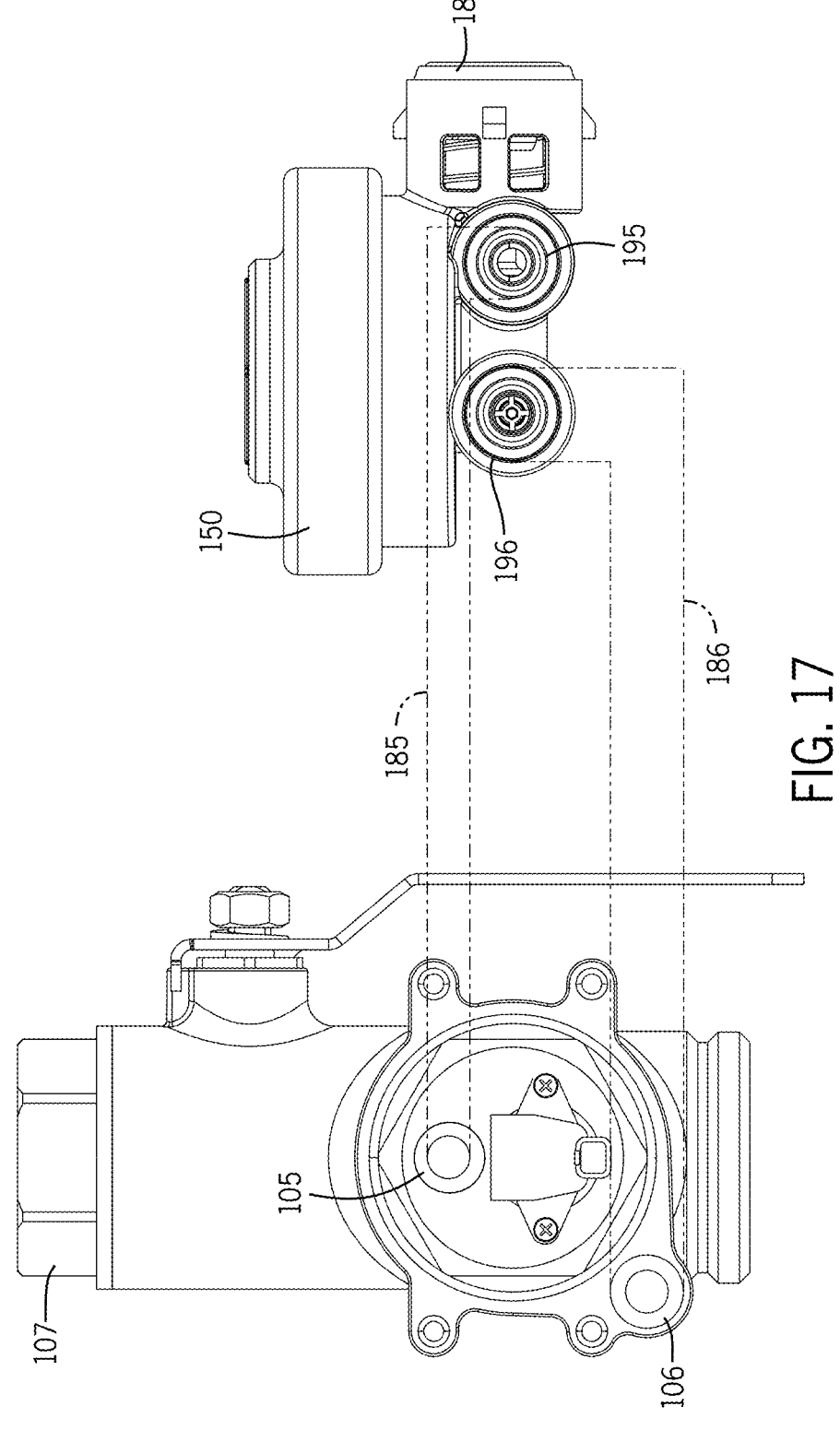
FIG. 17 illustrates connections between the manual valve at the face plate and the valve assembly of the in-wall toilet.

FIG. 16 illustrates an example block diagram for the manual valve 150 and valve assembly 120. FIG. 16 illustrates that water from valve assembly 101, ultimately inlet 102, is provided to the manual valve 150. This flow of water triggers the valve assembly 101 to provide a single flush. The manual valve 150 returns the water to the valve assembly 101, ultimately to the outlet 103. FIG. 17 illustrates connections between the manual valve 150 at the face plate and the valve assembly 101 of the in-wall toilet 10. The connections may include a first hose 185 that connects the override supplier port 105 of the valve assembly 101 to the override output 196 of the manual valve 150. Likewise a second hose 186 connects the output port 106 of the valve assembly 101 to the override input 195.

Figure 18:
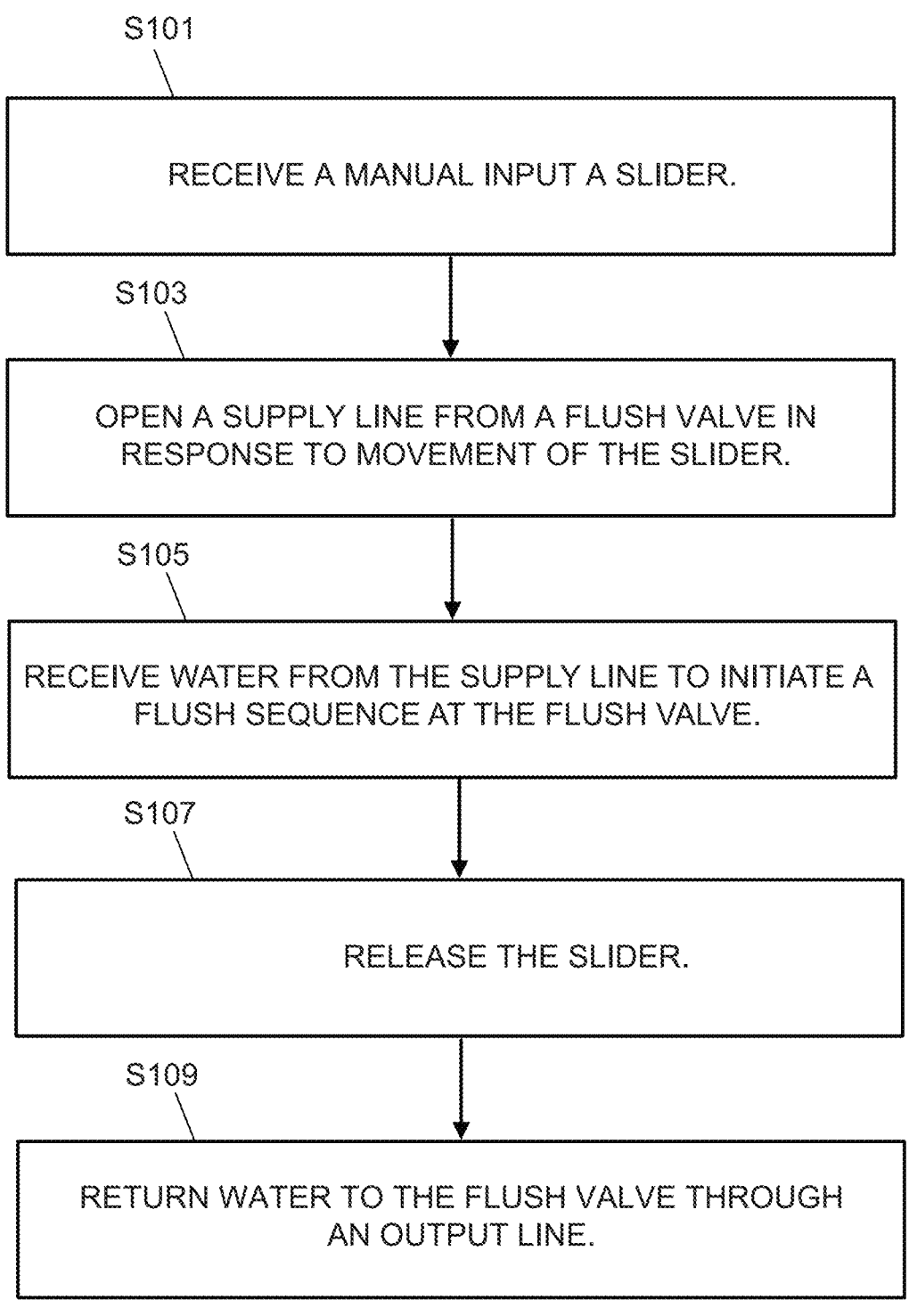
FIG. 18 illustrates an example block diagram for the manual valve.

FIG. 18 illustrates an example flow chart for operation for the manual override device 150. One or more acts may be performed under the action of water pressure. One or more acts may be performed under the action of user movement or actuation of one or more parts. Additional, different, or fewer acts may be included.

At act S101, a slider 151 of the manual override device 150 receives a manual input originating with a button 18 (e.g., the user presses a button on the manual override device 150). The manual input causes the slider 151 to move from a first position to a second position. One or more levers or mechanical devices may translate the motion of the button 18 to the slider 151. Pressure is relieved from above (e.g., to the left of) the piston 100. In one alternative, the slider 151 is replaced with a diaphragm that is configured to open the water pressure above (e.g., to the left of) the piston 100. The slider 151 and the diaphragm may be collectively referred to as manual override valve member.

At act S103, a supply line for a flush valve assembly 101 is opened in response to movement of the slider 151 to the second position. In other examples, the pressurized water may be released from the flush valve assembly 101 directly to an outlet of the flush valve assembly 101 or to a drain.

At act S105, the manual override device 150 receives water from the flush valve assembly 101, which initiates a flush sequence at the flush valve assembly 101. During the flush cycle, the flushometer first rises (or moves to the left), initiating the flush.

In one example, movement of the slider 151 opens a fluid path to release pressurized water from the flush valve assembly 101 to the manual override device 150. The manual override slider 151 reaches its maximum position and stops moving. In other examples, the manual override slider 151 may be quickly pressed and released. In either scenario, a single flush is achieved. The piston 100, then, begins closing. When the piston 100 is closed, the flush cycle is completed.

At act S107, optionally, the slider 151 is released by the input 18. The slider 151 may moved from the second position to the first position. A return line for the manual override device 150 is opened when the slider 151 is returned to the first position.

At act S109, water is returned to the flush valve assembly 101 from the manual override device 150 to the flush valve assembly 101 through the return line. Alternately, the manual may be expelled through another output directly to a drain line or to the toilet 10.

Figure 19:
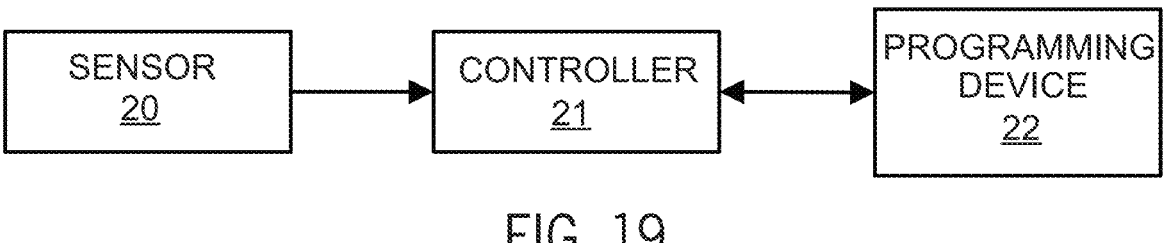
FIG. 19 illustrates an example system for the programmable controller.

FIG. 19 illustrates an example control system for the flush valve including a sensor 20, a controller 21, and a programming device 22. Additional, different, or fewer components may be included.

The programming device 22 is a communication device that enables communication between the controller 21 and external device such as a mobile device, tablet, or other computer which can be connected via wire or wirelessly to the controller 21 for the purpose of programming the controller 21 with one or more threshold, techniques, or sequences for operation of the valve assembly 101. The programming device 22 may also send commends to the controller 21 to flush the toilet. The term programming device 22 may also be used to refer to the mobile device that provides the programming to the controller 21 via the communication device. The mobile device may include or be replaced with a dedicated button, a switch, keypad, or other input device through which the user provides commands for the toilet 10. The input data may be received wirelessly through the communication device from a remote control, a smartphone, a tablet or another mobile device and provided to the controller 21.

The sensor 20 may be configured to generate sensor data for a proximity of a user, a presence of the user, or a gesture from the user in relation to the toilet 10 or urinal. The sensor 20 may generate sensor data for an object in vicinity to the toilet 10. The sensor 20 may be a proximity sensor that detects an object, such as the user's hands in proximity to the toilet 10. For example, the sensor 20 may detect the user's hands within a predetermined distance to the face plate 11. The sensor 20 may detect another object or a gesture made by the user. In some examples, the sensor may include any type of sensor configured to detect certain actions. A proximity sensor may be employed to detect the presence of an object within a zone of detection without physical contact between the object and the sensor. Electric potential sensors, capacitance sensors, projected capacitance sensors, light detection and ranging (LiDAR), and infrared sensors (e.g., projected infrared sensors, passive infrared sensors) are non-limiting examples of proximity sensors that may be employed with the systems of this application. Motion sensors may be employed to detect motion (e.g., a change in position of an object relative to the object's surroundings). Electric potential sensors, optic sensors, radio-frequency (RF) sensors, sound sensors, magnetic sensors (e.g., magnetometers), vibration sensors, and infrared sensors (e.g., projected infrared sensors, passive infrared sensors) are non-limiting examples of motion sensors that may be employed with the systems of this application. In another example, the sensor may include a time of flight (ToF) or a LiDAR that serves as a proximity sensor. The ToF sensor may be programmed to a predetermined detection range. The predetermined detection range may be defined by a distance or angle.

The controller 21 (processor) is configured to generate a control signal for the flush valve of the toilet based on the wirelessly received at least one configuration setting for the toilet 10 and in response to the sensor data. The control signal may activate the flush valve assembly 101 to open the piston 100 to provide water to the toilet bowl. The control signal may specify one or more configuration settings for the flush cycle of the toilet 10.

For the flush valve operation, the configuration setting for the toilet 10 may include a selection of a flush operation. Example types of flushes may include a low volume or economical flush and a high volume or full flush. Similarly, the flush options may include flush durations of different time periods. The flush options may include flush volumes of various sizes. The flush options may include different flush cycle sequences. Each flush cycle sequence may be included a predetermined flush time period. Each flush cycle sequence may include one or more delay time periods, one or more fill volumes, or one or more sanitation or cleaning operations. In any of these examples, the controller 21 is configured to generate data indicative of a plurality of flush options and send the data to the programming device 22. The programming device 22 is configured to present the data for the flush options to a user and receive a user input for a selection of the flush options, which is sent to the communication interface of the controller 21.

In addition, the programming device 22 may receive inputs from the user for a flush command (i.e., trigger a flush sequence). The command is processing by the programming device 22 and sent to the controller 21 for operation of the valve assembly 101 in accordance with the command. The flush command may be a real time instruction to flush the toilet 10.

The controller 21 (processor) is configured to generate an indicator signal for an indicator of the flush valve of the toilet 10 based on the wirelessly received at least one configuration setting. The indicator may include a light, an illuminated device (e.g., light emitting diode), a screen, audible sound, or another device. For the flush valve indicator, the configuration setting for the toilet 10 may include the type of indication or the information relayed by the indicator. Multiple indicators may be used. Any combination of the following indications may be used together.

In one example, the indicator represents an occupancy associated with the toilet 10. For example, when the sensor 20 detects the user in proximity to the toilet 10, the indicator is illuminated.

In one example, the indicator represents a battery level. The indicator may be illuminates a first color when the battery voltage is low (e.g., below a first predetermined level). The indicator may be indicated a second color when the battery is critical (e.g., below a second predetermined level). When the battery voltage is critical, the controller 21 may prevent the flush valve assembly 101 from flushing. For example, the solenoid may be grounded or otherwise held in a constant state.

In one example, the indicator represents a status of the flush valve assembly 101. The indicator may represent whether the flush valve assembly 101 is in operation. The flush valve assembly 101 may be considered in operation when the piston 100 is in the open position. The flush valve assembly 101 may be considered in operation when the piston 100 is in the open position and the valve 111 is open.

Another type of status is a fault indication. A fault may be an error or other state experienced by the flush valve assembly 101. The indicator may illuminate in different colors or different flash sequences in response to the particular type of fault. A plurality of indicators may be illuminated in a predetermined pattern according to the type of fault.

One example fault is that the flush valve assembly 101 has experienced an error. The sensor 20 may be a valve sensor configured to generate sensor data for an operation of the flush valve assembly 101. The controller 21 is configured to compare the sensor data for the flush valve assembly 101 to at least one fault value and identify a fault experienced by the flush valve assembly 101 in response to the comparison.

The actuator 13 (e.g., solenoid) may experience an abnormal current or other electrical parameter. In some examples, the controller 21 may include a sensor that detects current provided to the actuator 13 through solenoid connector or wire 177. The controller 21 may internally detect the current provided to the actuator 13 through solenoid connector or wire 177. When the current is outside of a range or below or above a predetermined threshold, the controller 21 illuminates the indicator (e.g., using a particular fault code) in response to the abnormal current to the actuator 13.

One example fault is that the flush valve assembly 101 has become unresponsive. This may occur when the piston is no longer freely moving between the open and closed position. Another reason could be the channel 122 has been clogged. Other blockages or malfunctions with the flush valve assembly 101 are possible. The unresponsive nature of the flush valve assembly 101 may be detected based on one or more flow sensors at the flush valve assembly 101 or in the toilet 10 or other plumbing fixture. When the flow is outside of a range or below or above a predetermined threshold, the controller 21 illuminates the indicator (e.g., using a particular fault code) using in response.

The flush valve assembly 101 may include one or more pressure sensors, which also may be illustrated by sensor 20. For example, a water pressure sensor may be located in inlet 102, outlet 103, on either side of the piston 100, or in channel 122. When the pressure is outside of a range or below or above a predetermined threshold, the controller 21 illuminates the indicator (e.g., using a particular fault code) in response to the pressure at the flush valve assembly 101, which may be referred to as an abnormal water pressure.

The flush valve assembly 101 may include one or more position sensors, which also may be illustrated by sensor 20. The position sensor may determine a fault experienced by the flush valve based on a position of the flush valve. For example, the position of the piston 100 may be determined by a position sensor. When the position of the piston 100 is outside of a range or below or above a predetermined threshold, the controller 21 illuminates the indicator (e.g., using a particular fault code) in response to the data generated by the position sensor.

Another particular fault involves the connections with the flush valve assembly 101 to the controller 21. The controller 21 may experience a lost connection with the flush valve. Example connections include the solenoid connector 176 and wire 177 and/or battery connector 179 and wire 178. When any of these become disconnected, damaged, or disrupted, the controller 21 may determined a fault has been experienced. The controller 21 may detect an open circuit or short on the connections through an electrical sensor. When the connection is lost, the controller 21 illuminates the indicator (e.g., using a particular fault code).

The controller 21 may also send fault codes or other maintenance information to the programming device 22. The programming device 22 may display the fault code or other indicator to the user (e.g., on the display of a mobile device).

The programming device 22 may return commands to the controller 21 for programming other operations of the controller 21.

The programming device 22 may generate and send a command to the controller to define one of the indicator sequences. That is, the command may associated characteristics, operation modes, settings, conditions, errors, etc. with a particular indicator sequence. In this way, different models of the toilet 10 may be customized remotely and/or the user may select the desired indicator sequences for certain situations. In some examples, such a configuration setting may be selected directly by the programming device 22 through a user interface.

In other examples, the programming device 22 may include an interface where a particular model of toilet is selected. The programming device 22 sends a command or set of commands to program the controller 21 according to the selected model. The controller 21 may also set communication capabilities in response to instructions from the programming device 22. The command from the programming device 22 may enable or disable certain functions of the controller 21. The functions that may be enabled or disabled may related to the type of sensor 20, wireless communication, or other functions. The command from the programming device 22 may adjust the range of the sensor 20 and/or what it detects (e.g., whether gesture commands are enabled, etc.). The command from the programming device 22 may add or remove certain types of sensing such as occupancy sensing from the controller 21.

In one particular example, the programming device 22 may send a command to the controller 21 that enables or configures the wireless communication (e.g., Bluetooth communication) for a remote control. The user may also enable or disable the wireless communication (e.g., Bluetooth communication) using the programming device 22. The programming device 22 may send a command to the communication device that determines a duration for a Bluetooth module to remain powered (e.g., Bluetooth Low Energy is only on for 15 minutes on power-up or may remain on indefinitely).

The controller 21 may also set servicing or diagnosing capabilities in response to instructions from the programming device 22. That is the types or fault sensing and fault indications may be defined, enabled, and/or disabled by commands sent from the programming device 22 to the controller 21.

Figure 20:
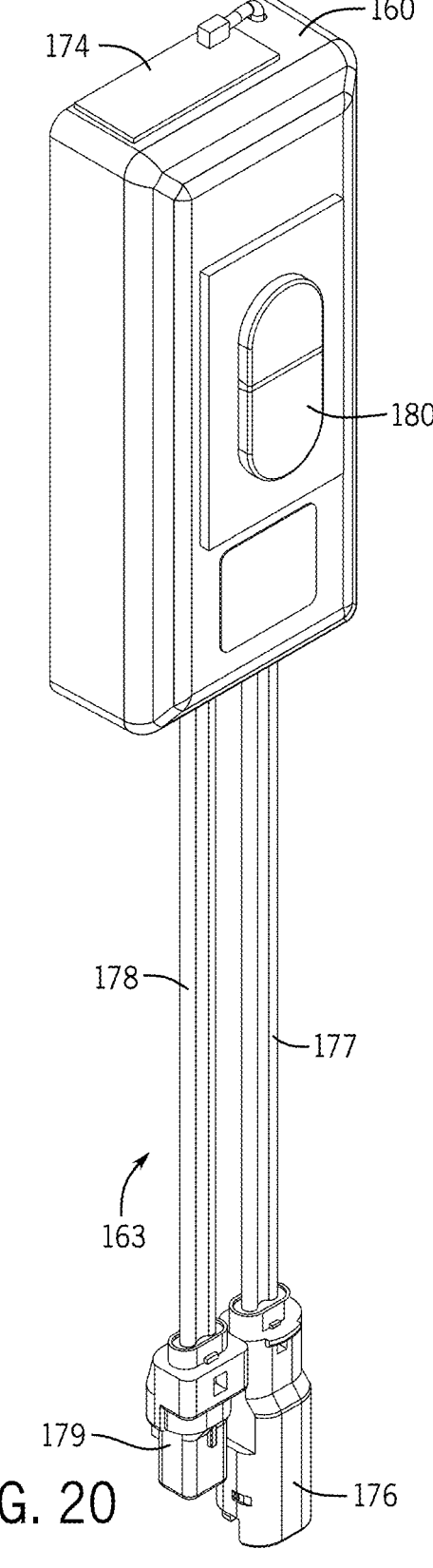
FIG. 20 illustrates an example programmable controller.
Figure 21:
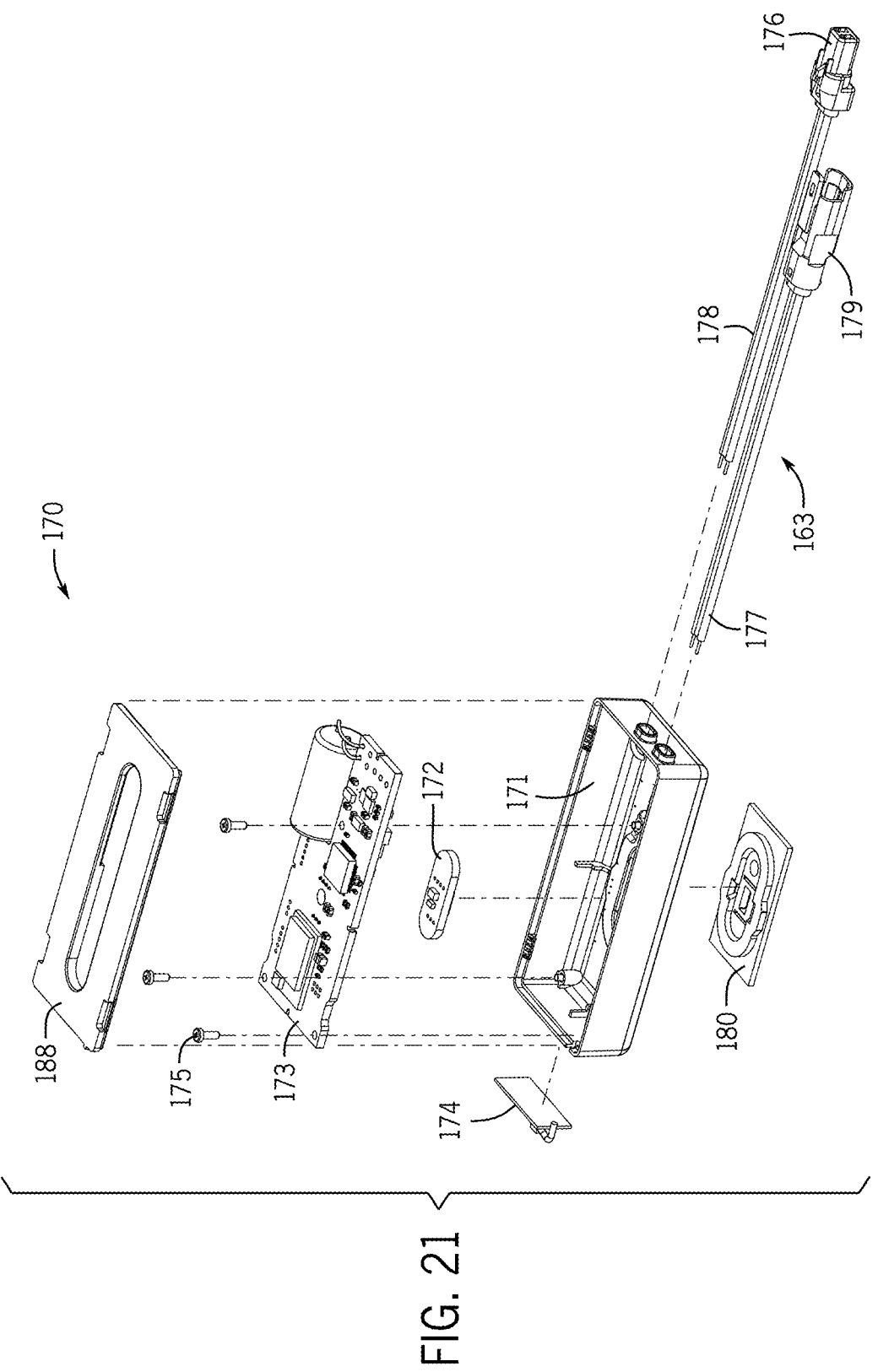
FIG. 21 illustrates an exploded view of the programmable controller.

FIG. 20 illustrates an example programmable controller 160. FIG. 21 illustrates an exploded view of the programmable controller 160. The programmable controller 160 may include a lens 180, a housing 171, a gasket 172, a control board 173, an antenna 174, fasteners 175, a back plate 188, a connection harness 163. The connection harness 163 may include a solenoid connector 176 and wire 177 and/or battery connector 179 and wire 178. The control board 173 (printed circuit board assembly) includes components such as a sensor, a memory, and a power supply. A lens 180 provides a transparent window for the sensor 20 to transmit and/or receive various types of signal from external to the programmable controller 160. The lens 180 may have split windows divided by a split light rib.

A communication interface may be configured to wirelessly receive at least one flush configuration setting for the toilet. Example communication interfaces include the antenna 174 or another operable connection including one or more ports where signals, physical communications, and/or logical communications may be sent and/or received. An operable connection may include a physical interface, an electrical interface, and/or a data interface. The communication interface or antenna 174 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

In one example, the communication interface is further configured to advertise a state of the flush valve. The state may accumulate over time. For example, the communication interface 174 may communicate to a network device one or more statistics for the flush valve. The statistics may include the number of flushes performed (e.g., over the lifetime, since a reset, or over a predetermined time range). The statistics may include the number of partial (e.g., low) flushes performed (e.g., over the lifetime, since a reset, or over a predetermined time range). The regular flushes may be associated with one volume and the low flushes may be associated with another volume such that together, the total water usage may be calculated. The statistics may include a number of errors has occurred.

The state may be a real time measurement. For example, the state of the flush valve may describe whether a user is currently detected in front of the toilet. The communication interface 174 (e.g., through Bluetooth) may communicate whether the user is currently detected. This information may be transmitted to a network device (e.g., bathroom gateway, building gateway) that receives similar information from multiple toilets. This information may be displayed to provide real time data such as the availability of bathroom stalls.

Figure 22:
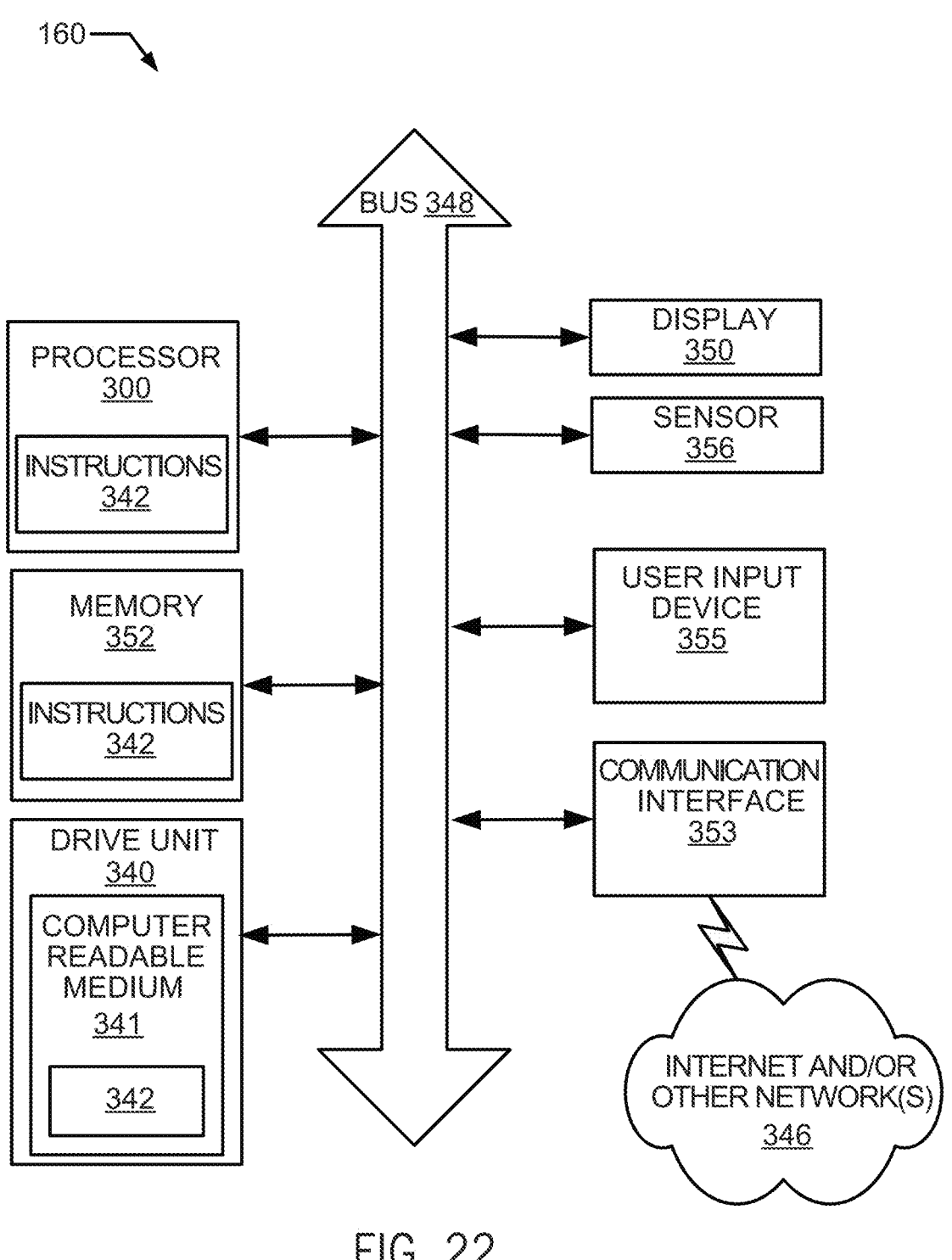
FIG. 22 illustrates another example embodiment for the programmable controller.

FIG. 22 illustrates another example embodiment for the programmable controller 160. The controller 160 may include a processor 300, a memory 352, and a communication interface 353 for interfacing with devices or to the internet and/or other networks 346. FIG. 22 is one illustration for the programmable controller 160. Referring to FIG. 19, the controller 21 and communication device or programming device 22 may each or both include an internal memory. The memory 352 represents internal memory to processor 300 or external memory in the alternative or in combination. Likewise, the communication interface 352 may include internal memory.

In addition to the communication interface 353, a sensor interface 356 may be configured to receive data from the sensors described herein or data from any source for detecting the presence of water, detecting the actuation of a flush cycle, detecting the presence of a user or gesture, or other devices described herein. The components of the control system 160 may communicate using bus 348. The control system 160 may be connected to a workstation or another external device (e.g., control panel) and/or a database for receiving user inputs, system characteristics, and any of the values described herein.

The input device 355 may include a switch (e.g., actuator), a touchscreen coupled to or integrated with, a keyboard, a remote, a microphone for voice inputs, a camera for gesture inputs, and/or another mechanism.

Optionally, the control system 160 may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be supported by any of the components described herein. The display 350 may be combined with the user input device 355.

Figure 23:
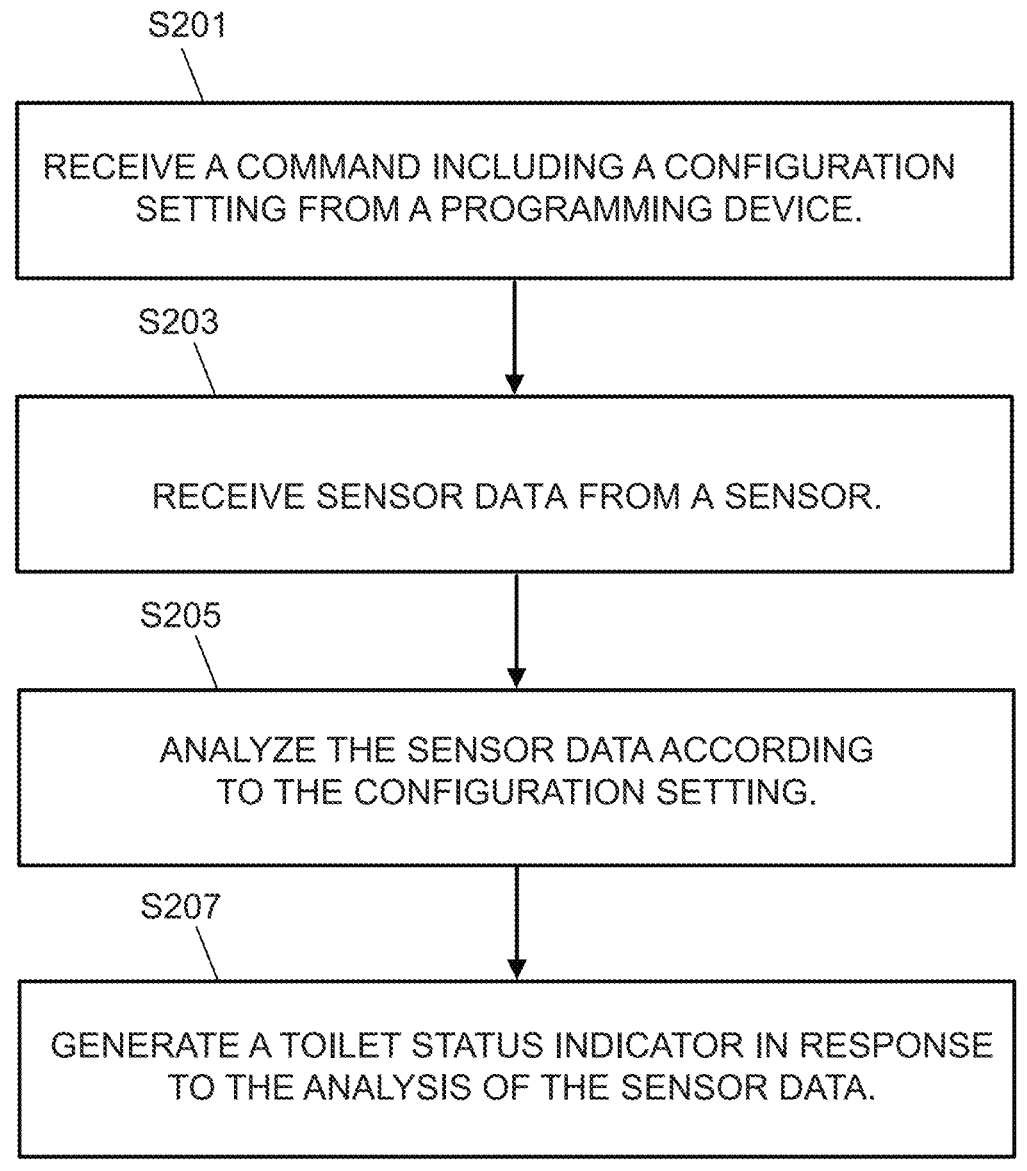
FIG. 23 illustrates an example flow chart for the controller of FIG. 21.

FIG. 23 illustrates an example flow chart for the controller of FIG. 21. Additional, different, or fewer acts may be included.

At act S201, the processor 300 receives a command from the programming device 22. The command may include a configuration setting that relates to the types of sensor data that is processed by the processor 300. In addition or in the alternative, the command may define the types of analysis performed on the sensor data. The command may define the potential errors or faults that may be detected in the sensor data.

The configuration setting may determine how quickly the sensor detects the presence of the user, or similarly, how quickly the processor 300 analyzes the sensor data detect the presence of the user. The configuration setting may include a detection time period that defines a sampling rate of the sensor data by the processor 300. The configuration setting may include a detection time period that determines a refresh rate that the sensor reports sensor data to the processor 300. The configuration setting may include a detection time period or range of sensor data over time that the processor 300 analyzes. Because the configuration setting is adjustable by the manufacturer, a plumbing professional, or the user, the operation of the sensor and sensitivity for detection of the user may be programmed by the programming device 22.

At act S203, the processor 300 may receive sensor data through sensor interface 356 from one or more sensors at the toilet or otherwise associated with the toilet 10. The sensors may include user detection sensors (e.g., proximity, gesture, position, motion). The sensors may detect operation of the flush valve or other operations of the toilet 10.

At act S205, the processor 300 analyzes the sensor data based on the command received from the programming device 22. At act S207, the toilet status indicator is generated and output based on the analysis of the sensor data. For example, a predetermined analysis may be performed on the sensor data when a corresponding function is enabled. In another example, a fault code or other indicator is defined by the command from the programming device 22 and results from the analysis of the sensor data. In another example, a type of communication is enabled by the command from the programming device 22 and used to report the analysis of the sensor data.

Figure 24:
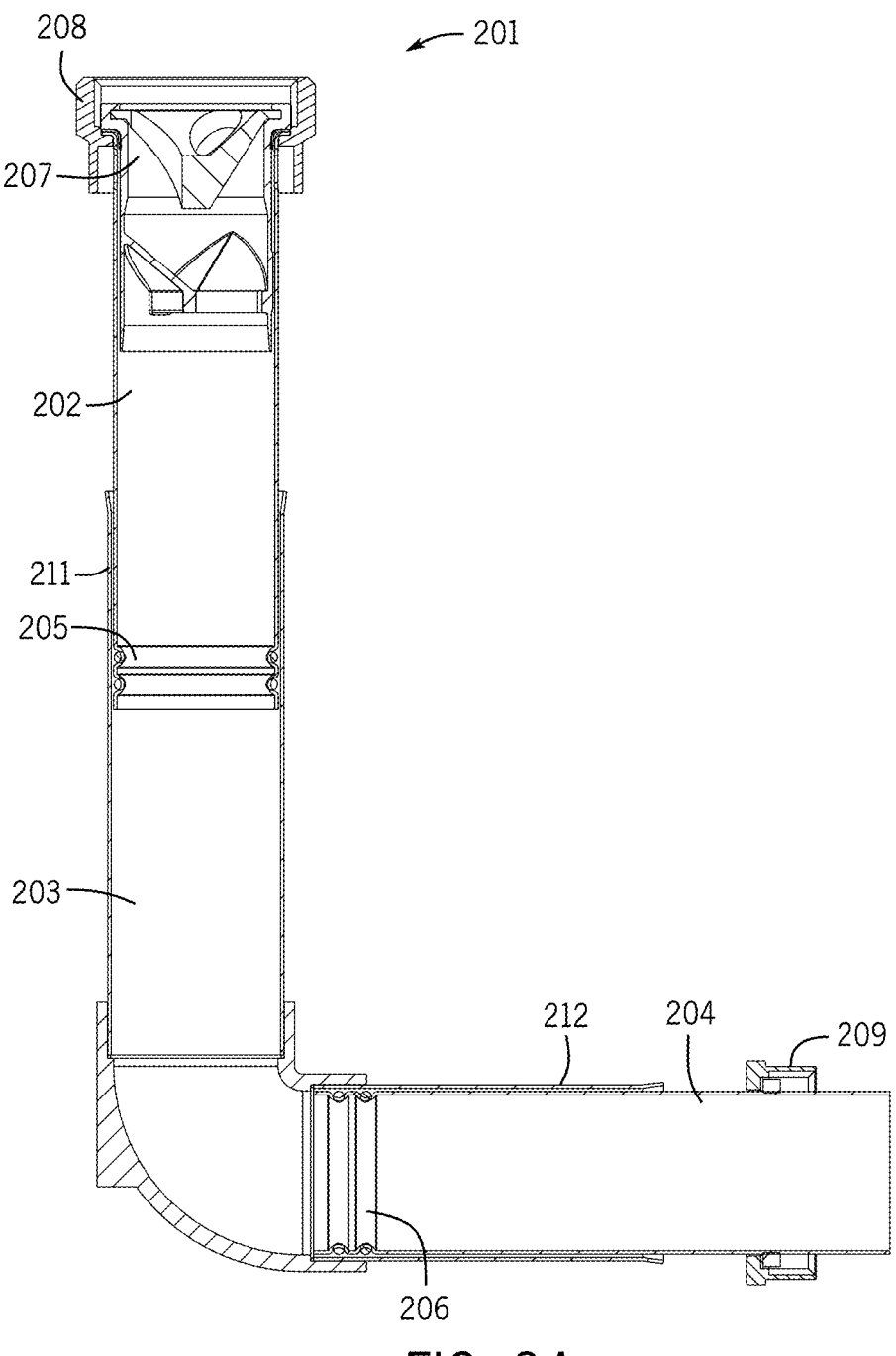
FIG. 24 illustrates an example toilet tailpiece assembly.
Figure 25:
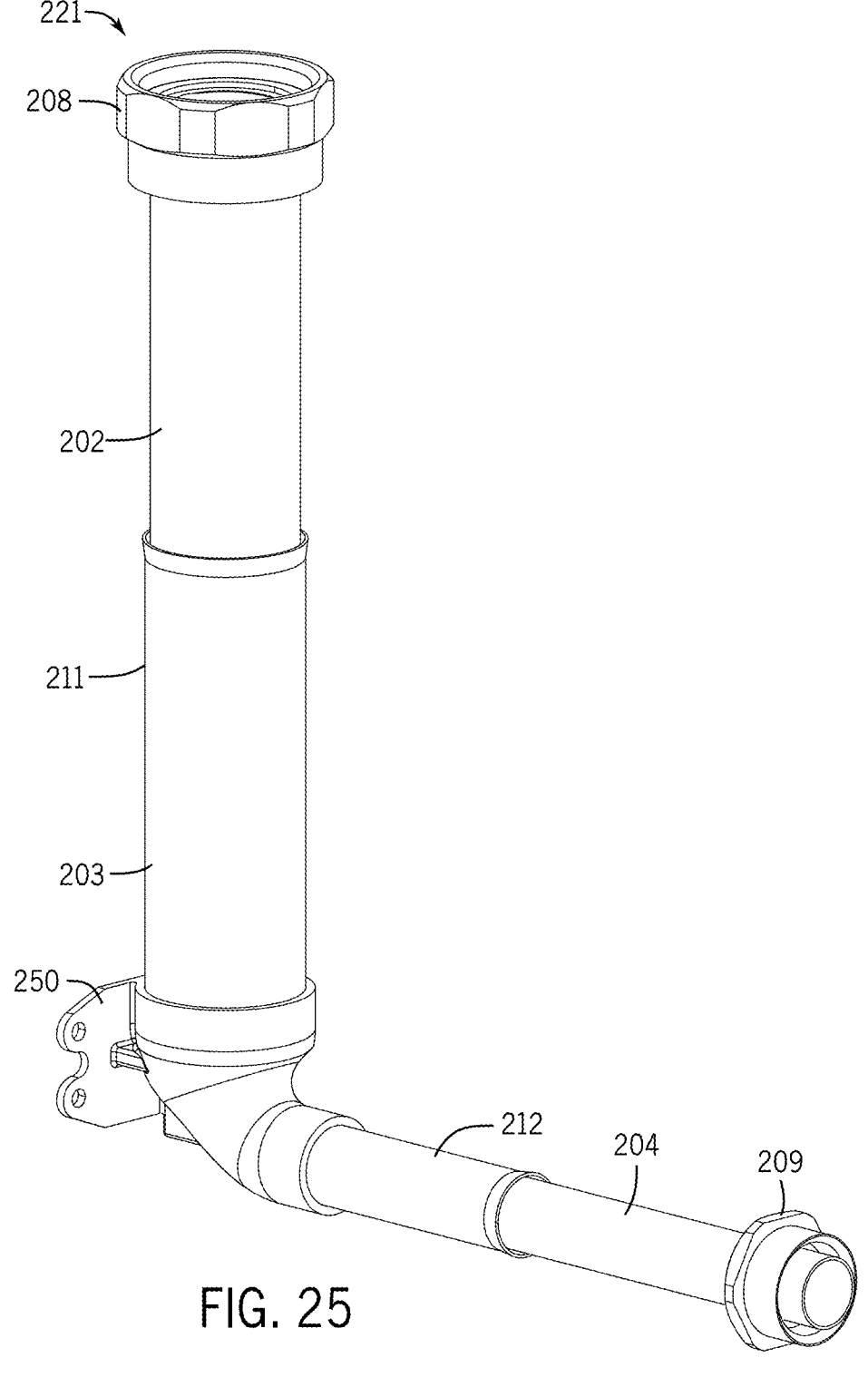
FIG. 25 illustrates an example urinal tailpiece assembly.

FIGS. 24 and 25 illustrate examples for the toilet tailpiece assembly 201. FIG. 24 includes a first size for the toilet tailpiece assembly 201 for a toilet. FIG. 25 includes a second size for the toilet tailpiece assembly 201 for a urinal. The toilet tailpiece assembly 201 includes a tailpiece 201, an elbow 203, and toilet stub 204. The elbow 203 includes a vertical section 211 and a horizontal section 212. Additional, different, or fewer components may be included.

The tailpiece 201 may connected to the valve assembly 101 using a fastening collar 208. A vacuum breaker 207 (and vacuum breaker tube 202) may also be attached between the tailpiece 201 and the valve assembly 101 (e.g., may be attached using the fastening collar 208). The vacuum breaker 207 may be included in a bibcock valve. The vacuum breaker 207 may be configured to prevent water from being siphoned backward into the water supply. The tailpiece 201 may include a seal 205, which may include an insert coupling, a flexible connector, or another device configured to connect the vertical section 211 of the elbow 203 with the tailpiece 201. The seal 205 may be a double O-ring that seals on both telescoping joints (the elbow 203 and the tailpiece 201).

The toilet stub 204 includes a fastening collar 209 configured to connect the toilet stub 204 to the toilet 10. The toilet stub 204 includes a seal 206 configured to seal the fluid connection between the toilet stub 204 and the horizontal section 212 of the elbow 203. The seal 206 may include an insert coupling, a flexible connector, or another device configured to connect the horizontal section 212 of the elbow 203 with the tailpiece 201. The seal 206 may be a double O-ring that seals on both telescoping joints (the elbow 203 and the tailpiece 201).

Figure 26:
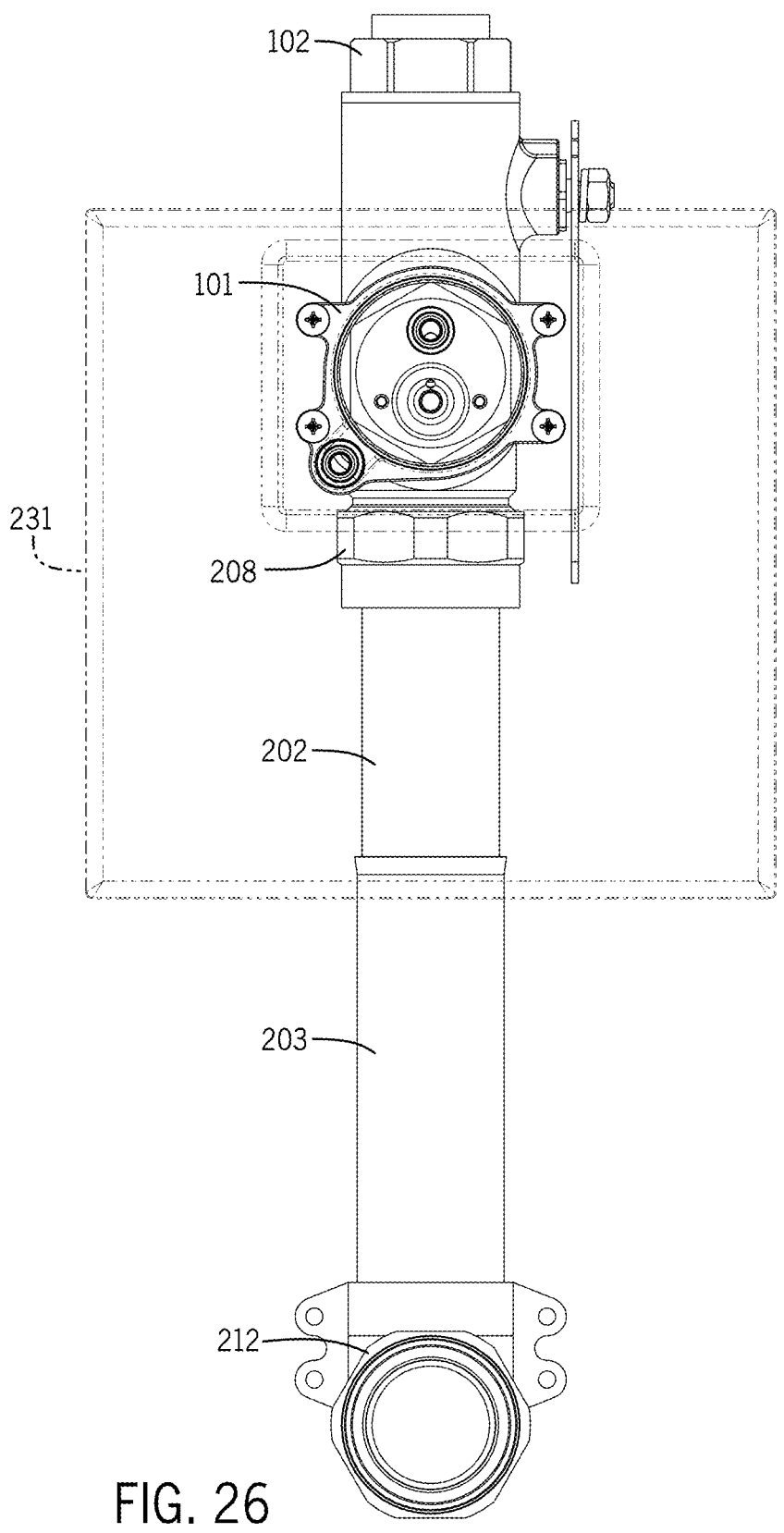
FIG. 26 illustrates an example mud guard for the tailpiece assembly.

FIG. 26 illustrates an example mud guard, which may be incorporated with wall bracket 231, for the tailpiece assembly 201. The mud guard may be mounted in a position corresponding to the face plate 11. The mud guard may be attached to the flush valve assembly 101 by one or more fasteners.

Figure 27:
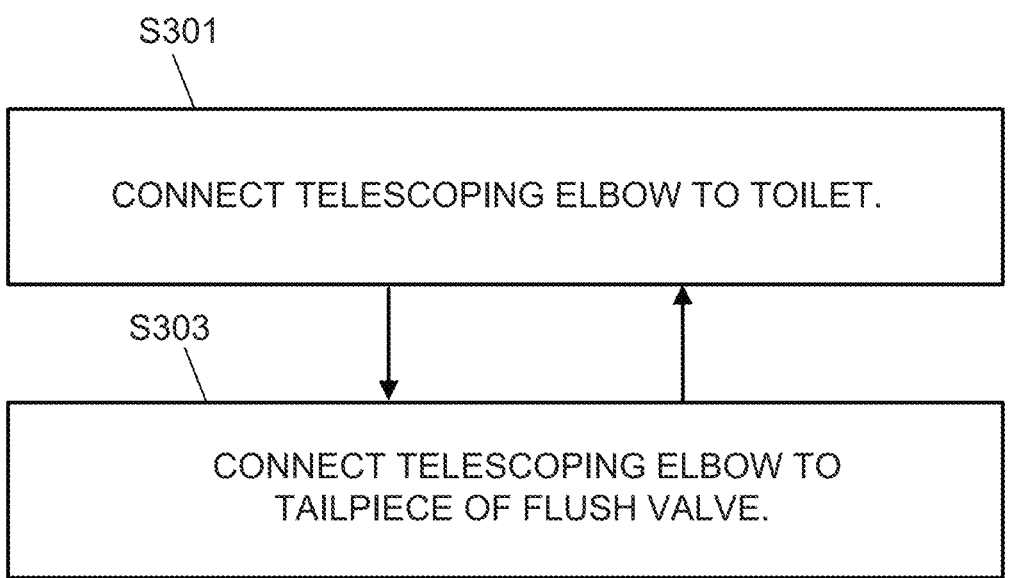
FIG. 27 illustrates an example flow chart for installation of the tailpiece assembly.

FIG. 27 illustrates an example flow chart for installation of the tailpiece assembly 201. Additional, different, or fewer acts may be included.

Initially, the mounting height and depth for the tailpiece assembly 201 is determined. A bracing 250 is installed to mount the tailpiece assembly 201 according to the determined height and depth.

Act S301 and S303 illustrate that the telescopic design including telescoping seals 206 and 205 for the elbow 203 provides versatility to the installation of the toilet 10. The telescopic design makes installation easier by adding adjustability and making the connection to rear spud fixtures (tailpiece 201) easier. Rear spud fixture (tailpiece 201) connections can be made outside of the wall by either telescoping the joint out or by removing the outlet from the tailpiece and making the connection to the fixture, then sliding the outlet back into place while mounting the fixture.

For example, in one installation technique, first at act S301, the toilet stub 204 from the toilet 10 is connected using telescoping seal 206 to the elbow 203. Next in act S303, the elbow 203 is connected to the vacuum breaker tube 202 using the telescoping seal 205.

In an alternative installation technique, first at act S303, the elbow 203 is connected to the vacuum breaker tube 202 using the telescoping seal 205. Next, at act S301, the toilet stub 204 is brought in contact with the elbow 203 that is already installed in the wall and connected using telescoping seal 206.

Processor 300 may be a general purpose or specific purpose processor, an application specific integrated circuit (ASIC), one or more programmable logic controllers (PLCs), one or more field programmable gate arrays (FP-GAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A control device for a flush valve of a toilet, the control device comprising:
   a communication interface configured to wirelessly receive at least one flush configuration setting for the toilet;
   a sensor configured to generate sensor data for at least a presence of a user; and
   a processor configured to generate a control signal for the flush valve of the toilet based on the wirelessly received at least one configuration setting for the toilet or in response to the sensor data, wherein the processor generates and the communication interface sends a plurality of flush options to a mobile device or a network, and the at least one flush configuration setting is based on the plurality of flush options and received from the mobile device or the network.

2. The control device of claim 1, wherein the configuration setting includes a detection time period for the sensor to detect at least the presence of the user.

3. The control device of claim 1, wherein the plurality of flush options includes flush cycle sequences, time periods, or flush volumes.

4. The control device of claim 1, wherein the communication interface is further configured to advertise a state of the flush valve.

5. The control device of claim 1, wherein the plurality of flush options includes flush commands.

6. The control device of claim 1, further comprising:

a solenoid connector electrically connected to the flush valve.

7. The control device of claim 1, wherein a communication device is connected to the control device through the communication interface.

8. A control device for a flush valve of a toilet, the control device comprising:

a sensor configured to generate sensor data for an operation of the flush valve; and a processor configured to compare the sensor data for the flush valve to at least one fault value and identify a fault experienced by the flush valve in response to the comparison; and a solenoid coupled to the flush valve, wherein the sensor data includes at least one electrical property of the solenoid, wherein the fault experienced by the flush valve includes an abnormal current draw in the solenoid, an abnormal water pressure, unresponsiveness of the flush valve, a position of the flush valve, or a lost connection with the flush valve.

9. The control device of claim 8, further comprising:

at least one indicator configured to display the fault experienced by the flush valve.

10. The control device of claim 8, further comprising:

a communication interface configured to wirelessly receive at least one flush configuration setting for the toilet.

11. The control device of claim 10, wherein the at least one flush configuration setting includes the at least one fault value.

12. The control device of claim 10, further comprising:

a user sensor configured to generate sensor data for a proximity of a user, a presence of the user, or a gesture from the user, wherein the processor is configured to generate a control signal for the flush valve of the toilet based on the wirelessly received at least one configuration setting for the toilet and in response to the sensor data.

13. The control device of claim 12, wherein the at least one flush configuration setting includes a setting for detection of the proximity of a user, the presence of the user, or the gesture from the user.

14. A control device for a flush valve of a toilet, the control device comprising:

a sensor configured to generate sensor data for an operation of the flush valve; and a processor configured to compare the sensor data for the flush valve to at least one fault value and identify a fault experienced by the flush valve in response to the comparison; and a communication interface configured to wirelessly receive at least one flush configuration setting for the toilet, wherein the at least one flush configuration setting includes the at least one fault value.

15. The control device of claim 14, further comprising:

a user sensor configured to generate sensor data for a proximity of a user, a presence of the user, or a gesture from the user, wherein the processor is configured to generate a control signal for the flush valve of the toilet based on the wirelessly received at least one configuration setting for the toilet and in response to the sensor data.

16. The control device of claim 15, wherein the at least one flush configuration setting includes a setting for detection of the proximity of a user, the presence of the user, or the gesture from the user.

* * * * *